(12) United States Patent
Koga

(10) Patent No.: US 8,289,539 B2
(45) Date of Patent: Oct. 16, 2012

(54) IMAGE FORMING APPARATUS, RESOURCE HOLDING APPARATUS, IMAGE FORMING SYSTEM, RESOURCE REQUESTING METHOD, RESOURCE HOLDING METHOD, RESOURCE MANAGING METHOD, AND PROGRAM

(75) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1240 days.

(21) Appl. No.: 11/834,076

(22) Filed: Aug. 6, 2007

(65) Prior Publication Data

US 2008/0052342 A1 Feb. 28, 2008

(30) Foreign Application Priority Data

Aug. 23, 2006 (JP) ................. 2006-226276

(51) Int. Cl.
*G06F 3/12* (2006.01)
(52) U.S. Cl. ........... 358/1.15; 358/1.1; 358/1.16; 705/5; 710/19; 710/20; 710/54
(58) Field of Classification Search ................. 358/1.15, 358/1.1, 1.16; 705/5; 710/19, 20, 54
See application file for complete search history.

(56) References Cited

U.S. PATENT DOCUMENTS

| | | | |
|---|---|---|---|
| 2002/0101611 A1 | 8/2002 | Shima | 358/1.15 |
| 2003/0186704 A1* | 10/2003 | Tamura et al. | 455/450 |
| 2005/0012951 A1* | 1/2005 | Madril et al. | 358/1.13 |
| 2006/0014529 A1* | 1/2006 | Tomiya et al. | 455/414.1 |
| 2006/0072156 A1 | 4/2006 | Shima | 358/1.15 |
| 2008/0004920 A1* | 1/2008 | Bird et al. | 705/5 |

FOREIGN PATENT DOCUMENTS

| | | |
|---|---|---|
| JP | 2002-215358 | 8/2002 |
| JP | 2004-110832 | 4/2004 |
| JP | 2005-74881 | 3/2005 |

OTHER PUBLICATIONS

English Machine Translation of JP 2004-110832-A (Ilnuma, published Apr. 8, 2004).*

* cited by examiner

*Primary Examiner* — Benny Q Tieu
*Assistant Examiner* — Juan Guillermety
(74) *Attorney, Agent, or Firm* — Fitzpatrick, Cella, Harper & Scinto

(57) ABSTRACT

An MFP which holds resources stores resource information about the held resources. Whether or not a resource holding request has been added to a resource downloading request from an SFP is discriminated. If a resource holding request has been added, a holding priority to decide a holding state of the held resources is set. The holding state of the held resources is controlled based on the holding priority.

6 Claims, 21 Drawing Sheets

400 RITAB

| 401 | 402 | 403 | 404 | 405 | 406 | 407 | 408 |
|---|---|---|---|---|---|---|---|
| ID | RESOURCE NAME | SIZE | OBTAINING SOURCE PEER | OBTAINING DATE/TIME | HOLDING PRIORITY | FINAL ACCESS TIME | THE NUMBER OF DLs |
| 1 | Font-A, dat | 12,345,678 | MFP-B | 2005/5/10 20:04 | Normal | 2005/5/18 10:34 | 10 |

| ID | RESOURCE NAME | SIZE | PEER NAME | ORIGINAL FLAG | HOLDING PRIORITY OF PEER | DOWNLOADING STATUS |
|---|---|---|---|---|---|---|
| 5 | Font-E, dat | 1,355,678 | MFP-B | No | Normal | Initial |

RITAB

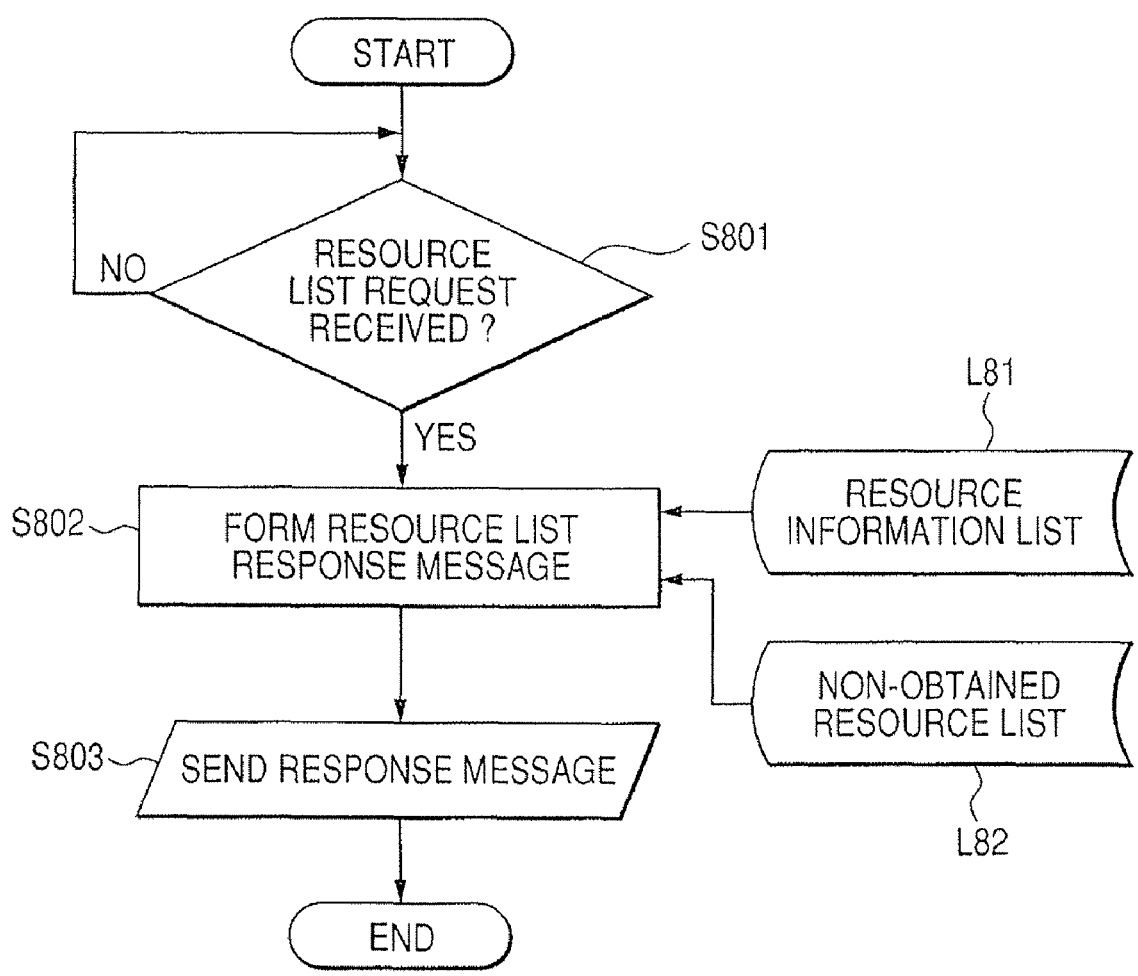

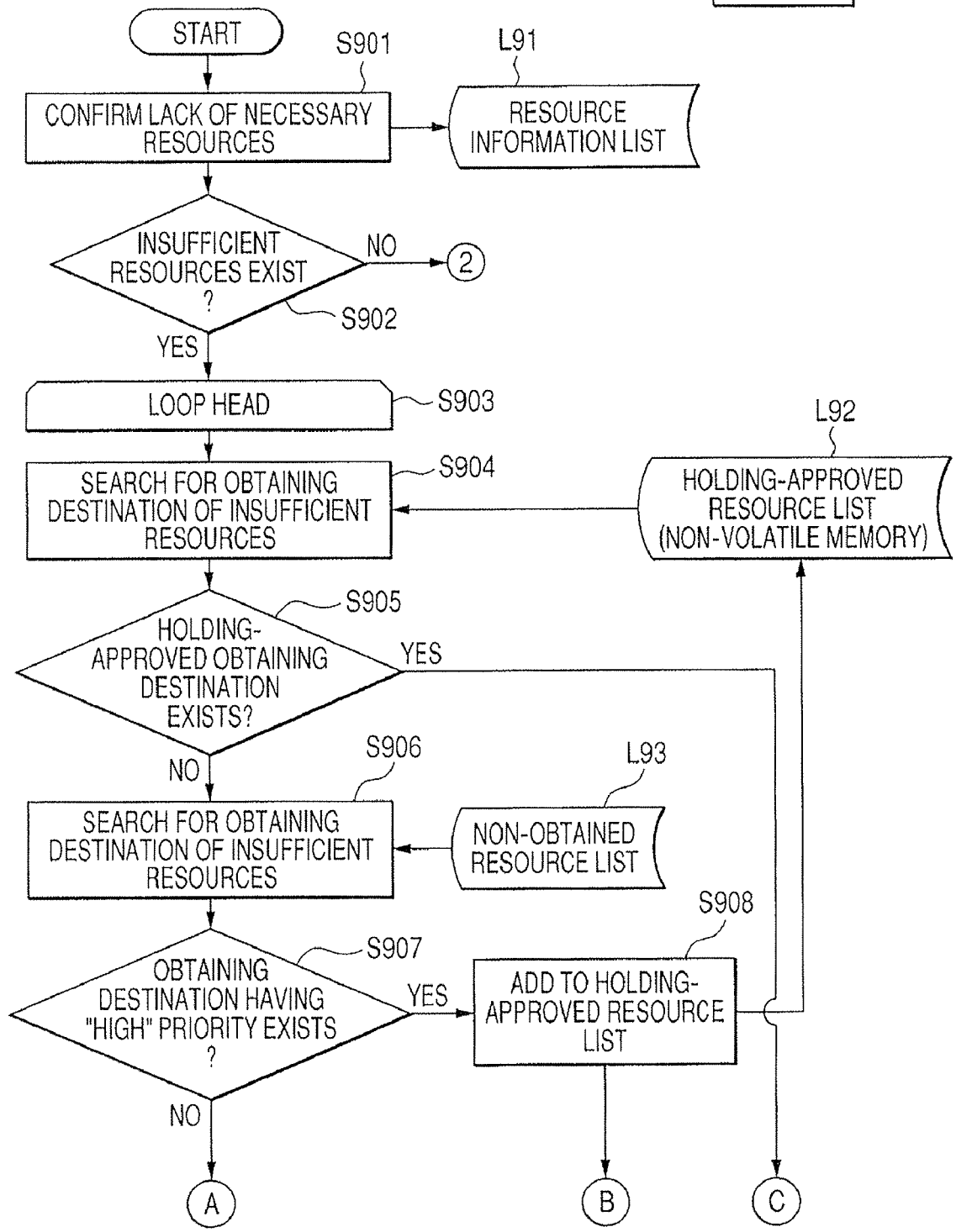

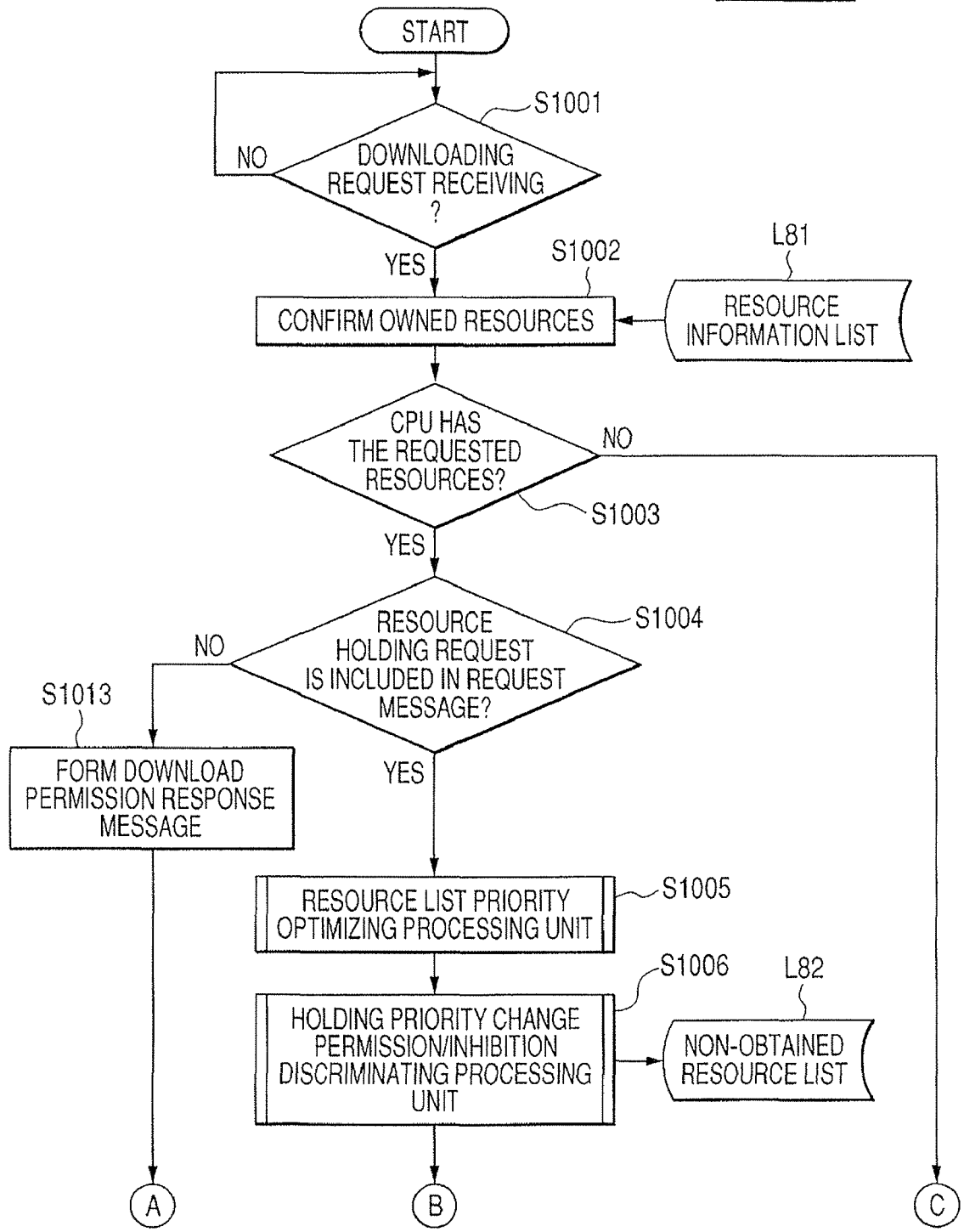

| | L82 | | |
| 1401 | 1402 | 1403 | 1404 |
| DOWNLOADING AREA SIZE | USING SIZE | MAX. HOLDING SIZE | HOLDING SIZE |
|---|---|---|---|
| 4,194,304KB | 1,494,224KB | 2,097,152KB | 198,048KB |

FIG. 14

| | 1300 | |
|---|---|---|
| 1301 | 1302 | 1303 |
| HDD CONDITION | HOLDING NUMBER CONDITION | SAME SUBNET CONDITION |
| Enable | Disable (0) | Enable |

FIG. 21

STORING MEDIUM
SUCH AS FD/CD-ROM

| DIRECTORY INFORMATION |
|---|
| 1ST DATA PROCESSING PROGRAM<br>PROGRAM CODE GROUP CORRESPONDING TO<br>STEPS IN FLOWCHART SHOWN IN FIG. 6 |
| 2ND DATA PROCESSING PROGRAM<br>PROGRAM CODE GROUP CORRESPONDING TO<br>STEPS IN FLOWCHART SHOWN IN FIG. 8 |
| 3RD DATA PROCESSING PROGRAM<br>PROGRAM CODE GROUP CORRESPONDING TO<br>STEPS IN FLOWCHART SHOWN IN FIG. 9 |
| 4TH DATA PROCESSING PROGRAM<br>PROGRAM CODE GROUP CORRESPONDING TO<br>STEPS IN FLOWCHART SHOWN IN FIG. 10 |
| 5TH DATA PROCESSING PROGRAM<br>PROGRAM CODE GROUP CORRESPONDING TO<br>STEPS IN FLOWCHART SHOWN IN FIG. 12 |
| 6TH DATA PROCESSING PROGRAM<br>PROGRAM CODE GROUP CORRESPONDING TO<br>STEPS IN FLOWCHART SHOWN IN FIG. 13 |
| 7TH DATA PROCESSING PROGRAM<br>PROGRAM CODE GROUP CORRESPONDING TO<br>STEPS IN FLOWCHART SHOWN IN FIG. 15 |
| 8TH DATA PROCESSING PROGRAM<br>PROGRAM CODE GROUP CORRESPONDING TO<br>STEPS IN FLOWCHART SHOWN IN FIG. 17 |
| 9TH DATA PROCESSING PROGRAM<br>PROGRAM CODE GROUP CORRESPONDING TO<br>STEPS IN FLOWCHART SHOWN IN FIG. 19 |
| 10TH DATA PROCESSING PROGRAM<br>PROGRAM CODE GROUP CORRESPONDING TO<br>STEPS IN FLOWCHART SHOWN IN FIG. 20 |

MEMORY MAP IN STORING MEDIUM

IMAGE FORMING APPARATUS, RESOURCE HOLDING APPARATUS, IMAGE FORMING SYSTEM, RESOURCE REQUESTING METHOD, RESOURCE HOLDING METHOD, RESOURCE MANAGING METHOD, AND PROGRAM

BACKGROUND OF THE INVENTION

1. Field of the Invention

The present invention relates to a resource requesting process of an image forming apparatus.

2. Description of the Related Art

According to a recent image forming apparatus, in addition to the image forming function which is inherent to the image forming apparatus, a communication interface and a hard disk are provided, a plurality of apparatuses are connected by a network, and data is transmitted and received among the apparatuses and can be stored into the hard disk.

Among the image forming apparatuses connected by the network may be one which obtains resources necessary for printing from a predetermined server on the network and executes the printing, as has been proposed in Japanese Patent Application Laid-Open No. 2002-215358.

According to that proposal, the resources necessary for printing can be obtained by inquiring of the server of a location of related information necessary for printing.

However, it is necessary to provide the server to be permanently stationed at the network, and is troublesome in terms of setting and managing. Therefore, there has been proposed an apparatus in which devices transmit and receive information without the server, by using a peer-to-peer communication technique instead of a client-server type communication technique and a distributed processing is realized (for example, refer to Japanese Patent Application Laid-Open No. 2005-074881).

There has also been proposed an apparatus in which although re-obtaining performance of data is important in the case of downloading of the data by a network, setting for inhibiting deletion of the data can be made by an apparatus of a data providing source (for example, refer to Japanese Patent Application Laid-Open No. 2004-110832).

SUMMARY OF THE INVENTION

In an image forming system constructed as mentioned above, the function for transmitting and receiving the resources necessary for printing can be achieved in the image forming apparatus by using the peer-to-peer technique. In this case, as for resource files to be exchanged, if a peer-to-peer mechanism is used, resource information is mutually exchanged and the files are exchanged.

However, in an image forming apparatus in which resources cannot be held in a non-volatile device, the process of downloading the necessary resources occurs each time a power source is turned on again. For example, in the case of an image forming apparatus which has a hard disk and in which resources can be stored in the hard disk, once the resources have been downloaded, it is unnecessary to download the resources again even after a power source is turned on again.

However, in a reasonable image forming apparatus, since the hard disk is not built in as a standard device, if the power source is turned on again, it is necessary to download the resources again. Therefore, in the case of such an apparatus, it is necessary to set the apparatus so that the resources can be downloaded as certainly as possible.

However, in terms of peer-to-peer characteristics, among the resource files which are being exchanged, a file whose use frequency is low may be deleted because there is an upper limit on a capacity of the disk. Therefore, it is not guaranteed that the image forming apparatus that has no hard disk can obtain the resource file from the same image forming apparatus as the image forming apparatus from which the resource file was obtained previously.

There is, consequently, a possible problem in that the resources cannot be certainly downloaded from the neighboring image forming apparatus on the network.

To solve such problem, in the related art, there is a method whereby setting is made to lock the data on the apparatus side of a data providing source, thereby avoiding only the designated data from being deleted even if a storing area is filled with data. However, in the peer-to-peer network, since file exchange is performed anytime, files are dynamically added. It is, therefore, troublesome and difficult that the deletion inhibiting setting of the file is individually made on the data providing source side.

The invention is made to solve the above problems and it is an object of the invention to provide such a mechanism that even in an image forming apparatus which cannot hold resources, the resources necessary for forming an image are held in another image forming apparatus and can be downloaded and used each time image forming is done.

To accomplish the above object, according to an embodiment of the invention, there is provided an image forming apparatus comprising: a determination unit adapted to determine whether a downloading request of resources including a holding request of the resources is made or a downloading request of resources which do not include the holding request of the resources is made; and a requesting unit adapted to make the downloading request of the resources including the holding request of the resources when it is determined by the determination unit that the downloading request of the resources including the holding request of the resources is made and make the downloading request of the resources which do not include the holding request of the resources when it is determined by the determination unit that the downloading request of the resources which do not include the holding request of the resources is made.

To accomplish the above object, according to another embodiment of the invention, there is provided a resource holding apparatus comprising: a unit adapted to, when a downloading request of resources including a holding request is received from an image forming apparatus, raise a priority at the time of holding the resources and download the resources into the image forming apparatus; and a unit adapted to, when a downloading request of resources which do not include the holding request is received from the image forming apparatus, download the resources into the image forming apparatus without raising the priority at the time of holding the resources.

To accomplish the above object, according to further another embodiment of the invention, there is provided an image forming system comprising: an image forming apparatus adapted to make a downloading request of resources including a holding request of the resources; and a resource holding apparatus adapted to, when the downloading request of the resources including the holding request is received from the image forming apparatus, raise a priority at the time of holding the resources and download the resources into the image forming apparatus.

To accomplish the above object, according to still another embodiment of the invention, there is provided a resource requesting method comprising: a determination step of determining whether a downloading request of resources including a holding request of the resources is made or a downloading request of resources which do not include the holding request of the resources is made; and a requesting step of making the downloading request of the resources including the holding request of the resources when it is determined in the determination step that the downloading request of the resources including the holding request of the resources is made and making the downloading request of the resources which do not include the holding request of the resources when it is determined in the determination step that the downloading request of the resources which do not include the holding request of the resources is made.

To accomplish the above object, according to still another embodiment of the invention, there is provided a resource holding method comprising the steps of: when a downloading request of resources including a holding request is received from an image forming apparatus, raising a priority at the time of holding the resources and downloading the resources into the image forming apparatus; and when a downloading request of resources which do not include the holding request is received from the image forming apparatus, downloading the resources into the image forming apparatus without raising the priority at the time of holding the resources.

To accomplish the above object, according to still another embodiment of the invention, there is provided a resource managing method comprising the steps of: making a downloading request of resources including a holding request of the resources; and when the downloading request of the resources including the holding request is received, raising a priority at the time of holding the resources and downloading the resources.

Further features of the present invention will become apparent from the following description of exemplary embodiments with reference to the attached drawings.

BRIEF DESCRIPTION OF THE DRAWINGS

FIG. 7 is a diagram showing an example of a non-obtained resource table which is managed by the image forming apparatus showing the first embodiment.

FIG. 8 is a flowchart showing an example of a second data processing procedure in the image forming apparatus showing the first embodiment.

FIG. 14 is a diagram for describing a construction of a holding request condition setting table for holding condition setting values which are used for the image forming apparatus showing the embodiment to discriminate whether or not a holding request is added.

FIG. 21 is a diagram for describing a memory map in a storing medium for storing various data processing programs which can be read out by the image forming apparatus according to the invention.

DESCRIPTION OF THE PREFERRED EMBODIMENTS

An exemplary embodiment for embodying the invention will now be described with reference to the drawings.

Description of System Construction

First Embodiment

An embodiment of the invention will be described hereinbelow with reference to the drawings.

Figure 1:
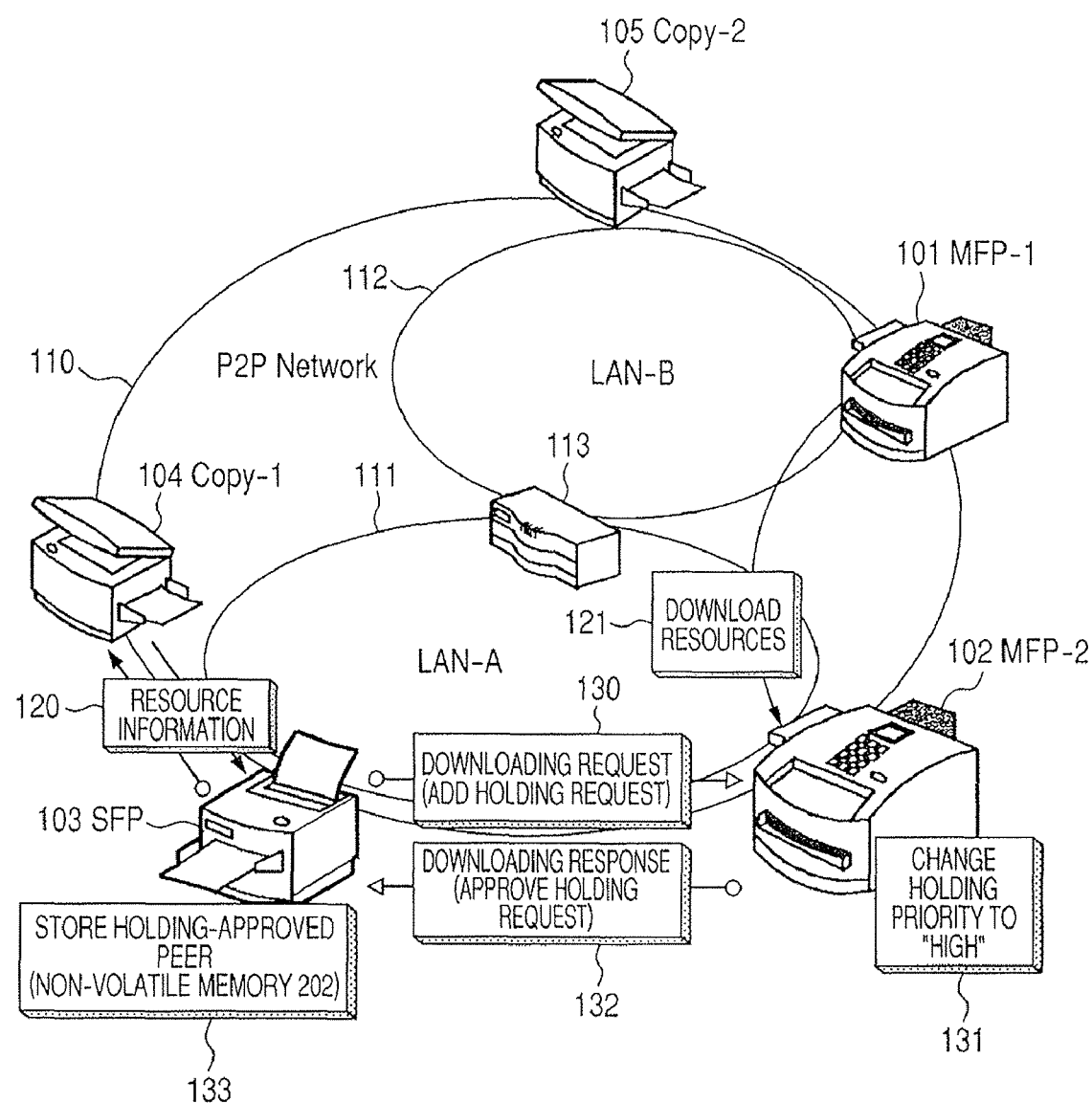
FIG. 1 is a conceptual diagram illustrating a system construction and the fundamental operation of an image forming system showing the first embodiment of the invention.

FIG. 1 is a conceptual diagram illustrating a system construction and the fundamental operation of an image forming system showing the first embodiment of the invention. In the embodiment, as an image forming apparatus, an example of the image forming system including one of a printer (SFP), a hybrid apparatus (multifunction printer; MFP), and a copying apparatus (Copy) will be described. In the embodiment, for instance, the example of Microsoft's Windows (registered trademark) operating system is shown as the operating system (OS) of an information processing apparatus using the image forming system. When a peer-to-peer connection is made by the OS of the Windows (registered trademark) system, the OS is constructed so that two typical protocols of "TCP/IP" and "NetBEUI" can be selected.

"TCP/IP" is a protocol which is used also in the Internet and is most frequently used at present. In Windows XP (registered trademark), "TCP/IP" has also previously been installed as a standard protocol.

The image forming system illustrated in FIG. 1 includes a plurality of image forming apparatuses. As a type of image forming apparatuses, multifunction printers (MFPs) 101 and 102 are connected to the image forming system through a LAN-A 111. A printer (SFP) 103, a copying apparatus (Copy-1) 104, a copying apparatus (Copy-2) 105, and the like are also connected through the LAN-A 111. In the case of generally referring to those apparatuses, they are simply mentioned as an "image forming apparatus".

In the present embodiment, as an SFP 103 of a resource requesting source, the SFP 103 will now be described as an image forming apparatus which does not have a unit for non-volatilely holding resources downloaded from another image forming apparatus as a construction of hardware. The SFP 103 of the resource requesting source is true of the case of an image forming apparatus which does not have a non-volatile memory enough to hold the resources.

Each image forming apparatus has a network interface card (NIC 204 shown in FIG. 2), is connected to the corresponding LAN, and can make communication by the network.

In FIG. 1, LAN-A 111 and LAN-B 112 are connected by a router 113 as a device for relaying information in the network. Communication between the LANs is intermediated by the router 113.

Each image forming apparatus participates in a group 110 of the peer-to-peer network and can mutually exchange apparatus information and data by using a peer-to-peer communicating method.

In the embodiment illustrated in FIG. 1, the fundamental operation which is executed in the case where the SFP 103 makes a request to the MFP-2 102 for resources (font or the like) necessary for printing is illustrated. The resources are not limited to the font but also incorporate the case of a form.

First, in order to participate in the peer-to-peer network group 110, the SFP 103 makes the peer-to-peer connection to the copying apparatus 104 as an adjacent initial node and exchanges resource information 120 held in those apparatuses.

By exchanging the resource information 120, the SFP 103 recognizes that the necessary resources exist in the MFP 102 on the network. The MFP 102 has already participated in the peer-to-peer network group 110 and downloads resources 121 which are not held in its own apparatus from the MFP 101. The downloaded resources 121 are temporarily held in a RAM 203. That is, in the case where the SFP 103 has downloaded resources from another image forming apparatus, the SFP executes a printing process by using those resources and, thereafter, if power is turned off, the resources themselves are extinguished from the RAM. In other words, the SFP 103 is an image forming apparatus constructed in such a manner that after the power is turned off, printing using the downloaded resources is not guaranteed unless the same resources are again downloaded from another image forming apparatus.

However, the SFP 103 has a non-volatile memory of a small capacity and stores information to specify the image forming apparatus in which the downloaded resources have been stored and which specifies the peer that approved the resource holding has been stored in the SFP 103. It is desirable that the small-capacity non-volatile memory is constructed by what is called an NVRAM whose RAM area is backed up by a battery or the like. The peer that approved the resource holding is the MFP 102. When the SFP 103 makes a request of another image forming apparatus (MFP 102) for the resources, the SFP 103 issues a resource obtaining request to the MFP 102 together with a resource holding request so that the resources are not deleted.

Specifically speaking, the SFP 103 transmits a downloading request 130 to the MFP 102 having the necessary resources and requests permission for downloading.

In this instance, the holding request as a feature of the present embodiment is added and the downloading request 130 is transmitted.

If a holding priority can be changed, the MFP 102 which received the downloading request 130 changes and sets a holding priority 131 indicative of the holding priority of the requested resources to "High". The MFP 102 transmits a downloading response 132 which permits the downloading request 130 to the SFP 103.

Thus, in the SFP 103 which received the downloading response 132 from the MFP 102, the information of the MFP 102 as a peer which approved the holding request for the requested resources is stored into the non-volatile memory together with the resource information whose downloading has been permitted. An NVRAM or the like having a small capacity is desirable as such a non-volatile memory.

At this time, the MFP 102 changes the holding priority 131 of the resources which have been held and managed to "High" and releases the resources whose priorities are low even in the case where the MFP 102 opens the resource area due to the lack of memory area or the like. By this method, the risk that the resources whose holding has been requested from another image forming apparatus are erased is reduced and a state in which the SFP 103 can obtain the same resources from the MFP 102 in a short time can be maintained.

Although the fundamental operation has been described here by using the SFP 103 as a reference, each image forming apparatus which participates in the peer-to-peer network group 110 similarly executes the fundamental operation according to the foregoing procedure. Specifically speaking, each image forming apparatus exchanges the resource information, makes the downloading request and response of the necessary resources, and executes the actual downloading, thereby exchanging the resources.

As mentioned above, in the present embodiment, when another image forming apparatus has approved the holding request from the SFP 103, information indicative of the approved peer for specifying another image forming apparatus is sent by way of response to the SFP 103.

Therefore, by holding the holding-approved peer in the NVRAM or the like, when the power source of the SFP 103 is subsequently turned on, that information is used for immediately specifying the obtaining destination which obtains the same resource request from a plurality of image forming apparatuses.

Thus, even when the power is turned on again, the downloading request destination can be simplified, the time for re-searching the resources is shortened, and only the holding-approved peer is searched for. Therefore, an uncertain state in which the necessary resources cannot be downloaded can be also avoided.

A feature of the image forming system in the present embodiment will be described hereinbelow.

As illustrated in FIG. 1, according to the image forming system in the present embodiment, any one of the image forming apparatuses has the non-volatile memory unit. The resources which are used for forming the image can be stored as a cache of another image forming apparatus in the memory unit.

In this case, the image forming apparatus on the requesting side which forms the cache makes the holding request to hold the resources.

The image forming apparatus which requests the downloading of the resources, for example, the SFP 103, does not have the hard disk or the like for non-volatilely storing the resources. Therefore, the apparatus enters a state where the downloaded resources are extinguished from the non-volatile memory unit due to the turn-off of power and, when power is turned on again, the resources are not downloaded.

Therefore, first, the SFP 103 mutually exchanges the resource information held in its own NVRAM or the like with the image forming apparatus on the network, thereby forming the information of the resources which are not obtained yet. Details of such forming process will be described with reference to FIG. 6.

When the SFP 103 issues the resource downloading request to the MFP 102 as an image forming apparatus which holds the resources which are used for forming the image based on the non-obtained resource information, the resource holding request is added and the downloading request is made. Details of such adding process will be described with reference to FIGS. 9A and 9B. The SFP 103 has the NVRAM as a memory unit for non-volatilely storing the resource information.

Therefore, when the SFP 103 makes the downloading request, whether or not the SFP 103 has a non-volatile holding unit (hard disk or the like) for non-volatilely holding the resources is discriminated. If the SFP 103 does not have the non-volatile holding unit (hard disk or the like), each time the power source is turned on, the image forming apparatus destination for downloading the resources which are used for forming the image is determined to be, for example, the MFP 102 based on the resource information stored in the memory unit.

The MFP 102 which functions as an image forming apparatus which accepts the downloading request of the resources stores the resource information of the resources held in the holding unit constructed by the non-volatile memory unit such as a hard disk or the like. The resource information is stored, for example, as a table of a data structure illustrated in FIG. 4.

The MFP 102 discriminates whether or not the resource holding request has been added to the resource downloading request from any one of the image forming apparatuses. Details of such discriminating process will be described with reference to FIGS. 10A and 10B.

If it is determined that the resource holding request has been held, a CPU held in the MFP 102 sets the holding priority to determine the holding state of the resources held in the holding unit.

The CPU held in the MFP 102 controls the holding state of the resources held in the holding unit based on the holding priority. The holding state is constructed in such a manner that it can be managed by, for example, one of the high priority, low priority, normal priority, and the like.

The CPU held in the MFP 102 responds by sending holding-approved information showing that the holding request has been approved to the image forming apparatus of a requesting source. Details of such process will be described with reference to FIGS. 10A and 10B.

If the CPU of the SFP 103 of the requesting source determines that the holding-approved information responsive to the holding request is included in the response information which is responded from the MFP 102, the holding priority in the resource information stored in the memory unit is set to a relatively high priority. Thus, when the power source is turned on, the SFP 103 can recognize that the resources having the high holding priority have been cached in another image forming apparatus. In this case, the device name and the like of another image forming apparatus are recognized. The resources whose probability of being used for the image creation is high are downloaded from the neighboring MFP 102 and held in the RAM or the like.

In this case, the MFP 102 controls such that the resources having the high holding priority held in the holding unit are removed from the resource candidates to be deleted.

Thus, the MFP 102 avoids a situation in which the resources which have been cached for the SFP 103 are erroneously extinguished. Such situations, in which the resources having the high holding priority are extinguished when there is a request for releasing the memory resources of the MFP 102, can be avoided to the greatest extent possible. Since the SFP 103 can immediately specify the resource obtaining destination when the power source is turned on again by referring to the resource information held in the NVRAM or the like, the download processing time of the SFP 103 which uses the resources is shortened.

The resource information includes a resource name, a resource size, a device name of the obtaining source, a holding priority, a downloading date/time, and the number of downloading times. Its construction will be described hereinbelow.

Based on the resource information, the MFP 102 discriminates whether or not the holding priority of the holding resources should be set to a relatively low priority by itself. Such a discriminating process will be described in FIGS. 10A and 10B. By such a discriminating process, the resources cached for another image forming apparatus which is not used can be easily deleted from the holding unit, thereby enabling the holding unit to be effectively used.

As mentioned above, the image forming system is a system in which a plurality of image forming apparatuses are connected so that they can communicate by P2P. The table for managing the resource information can be non-volatilely stored in any one of the image forming apparatuses.

Therefore, even in the case where any one of the image forming apparatuses is a reasonable image forming apparatus which does not have the holding unit for non-volatilely storing the resources themselves, when the power source is turned on again, the resource information is exchanged with each image forming apparatus. Thus, the resources are downloaded in a short time from the image forming apparatus in which the non-obtained resources have been cached and can be used for image creation.

Although the system construction and the fundamental operation of the invention have schematically been mentioned above, a specific embodying method will be described in detail hereinbelow with reference to the drawings.

First, an internal construction of one of a multifunction printer, a printer, and a copying apparatus as image forming apparatuses will be described with reference to FIG. 2.

Figure 2:
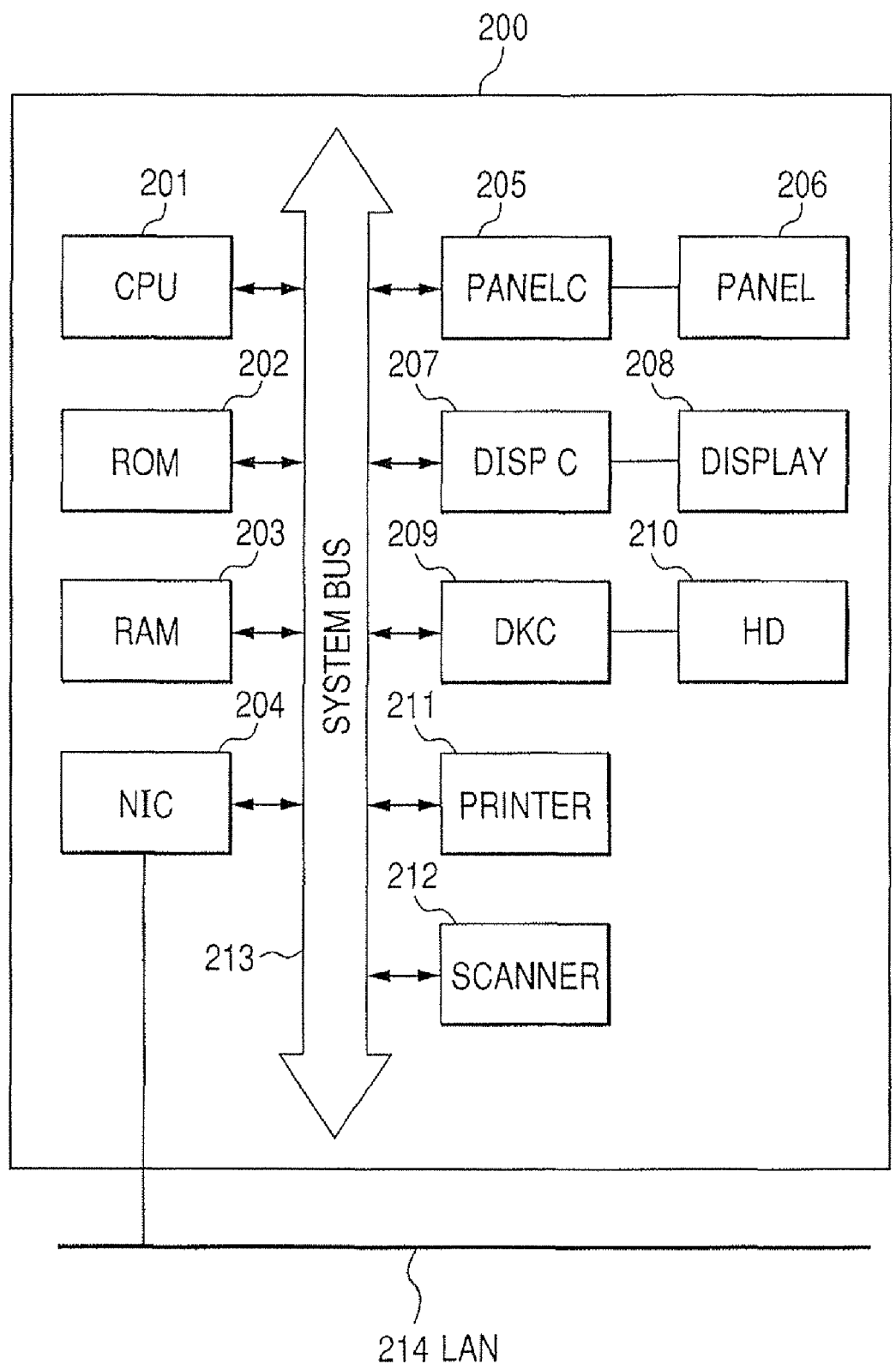
FIG. 2 is a block diagram for describing a construction of each MFP illustrated in FIG. 1.

FIG. 2 is a block diagram for describing the construction of each of the MFPs 101 and 102 illustrated in FIG. 1. This diagram illustrates the internal construction of each of the multifunction printers (MFPs) 101 and 102 in the image forming system illustrated in FIG. 1. A controller of the multifunction printer of the invention also has a construction similar to that mentioned above. Although the SFP 103 illustrated in FIG. 1 also has a CPU, a ROM, a RAM, an NIC, and the like as illustrated in FIG. 2, the SFP does not have the unit for non-volatilely holding the resources downloaded from another image forming apparatus.

Similarly, since the SFP 103 is a printer for executing only the printing function, naturally, the SFP does not have an image reading unit and does not have an HD or the like, which will be described hereinafter, either.

In FIG. 2, a whole multifunction printer (MFP) 200 has a CPU 201 for executing software stored in a ROM 202 or a large-scale storing device 210 such as a hard disk or the like. The CPU 201 integratedly controls each device connected to a system bus 213.

The RAM 203 functions as a main memory, a work area, or the like of the CPU 201. An external input controller (PAN-ELC) controls instruction inputs from various buttons, a touch panel 206, and the like provided for the MFP. A display controller (DISPC) 207 controls a display of a display module 208 constructed by, for example, a liquid crystal display (DISPLAY) or the like.

The network interface card (NIC) 204 bidirectionally transmits and receives data to/from one of another network apparatus, a file server, and the like by a predetermined protocol through a LAN 214. A TCP/IP or the like is desirable here as a predetermined protocol.

A print unit 211 is a printer for printing an image onto paper (sheet) by, for example, an electrophotographic system, an ink-jet system, or the like. An image reading unit 212 has a scanner unit for scanning an optical reading sensor for reading the image printed on the paper. In many cases, since an automatic document feeder (ADF; not shown) has been attached as an option to the image reading unit 212, a plurality of original documents can be automatically read. In this case, in the state where the scanner unit has been moved and fixed to a predetermined reading position, only the original is conveyed at a predetermined conveying speed.

The large-scale storing device 210 is connected to the system bus 213 through a DKC 209. There is a case where the storing device 210 is also used as a temporary storing location of the image data.

Although the internal construction of the printer (SFP) 103 in FIG. 1 has a structure which is fundamentally close to that of the MFP in FIG. 2, the image reading unit 212 does not exist and it is a main object to print the image onto the paper. The large-scale storing device 210 is not provided for a reasonable printer.

The internal construction of each of the copying apparatuses 104 and 105 in FIG. 1 is fundamentally the same as that of the MFP.

A software construction of a program which operates on the image forming apparatus showing the embodiment will now be described with reference to FIG. 3 in conjunction with the peer-to-peer.

Figure 3:
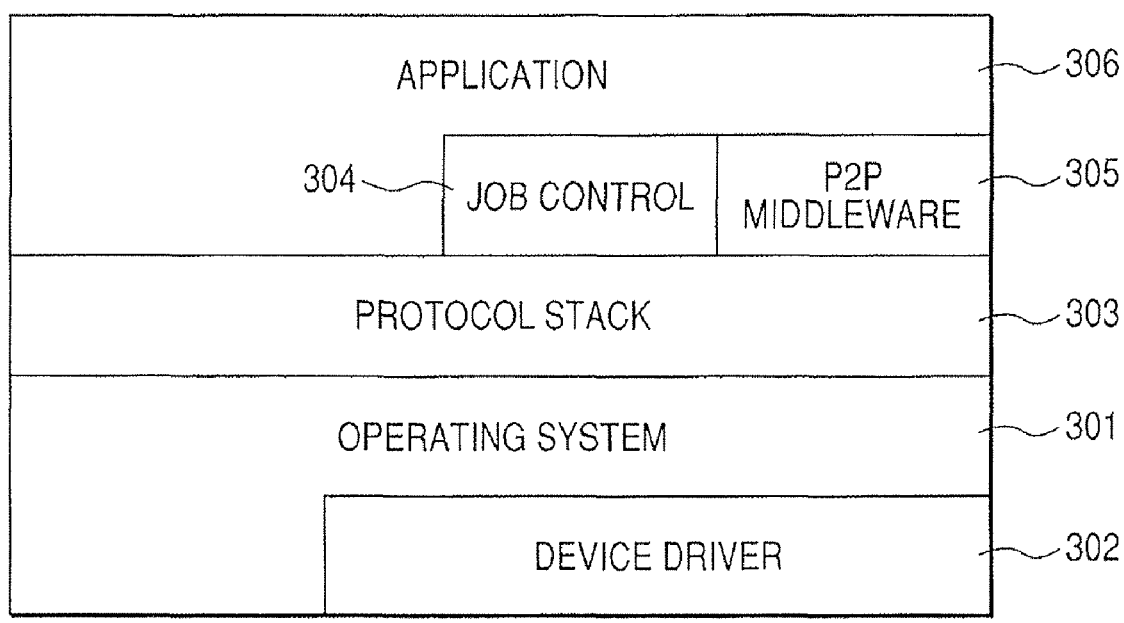
FIG. 3 is a diagram for describing a module construction of an image forming apparatus showing the first embodiment.

FIG. 3 is a diagram for describing a module construction of the image forming apparatus showing the embodiment.

In FIG. 3, a module group 300 is illustrated as a software construction, in a layer manner, of the image forming apparatus which realizes the peer-to-peer communication.

In the image forming apparatus illustrated in FIG. 1, each device and application are controlled and managed by an operating system (OS) 301. Control of each device described in FIG. 2 is made by a device driver 302. The image forming apparatuses are the apparatuses 101 to 105.

The network interface card (NIC) 204 in FIG. 2 is also controlled by the layer of the device driver 302.

For example, the data received by the NIC 204 is sent to a protocol stack 303 by the device driver 302. In the protocol stack 303, an assembly of a received packet, a discrimination of a packet type, an extraction of a data portion, and the like are executed and the data is sent to an upper layer.

If the received data indicates a communication type of the peer-to-peer (P2P), the protocol stack 303 transmits the data to a P2P middleware 305 for making P2P communication control. Maintenance and management of the connection/communication of the peer-to-peer are performed by the P2P middleware 305. Metadata obtained by the P2P is transported to an application layer 306. A final process such as storage, management, or the like of the data is executed.

In the case of the communication for the image creation such as printing or the like, a JOB control layer 304 is notified of the data. The data is processed in the proper application layer 306 and a target JOB process is executed.

Details of the characteristic portions in the invention will now be described.

The details of the characteristic portions will now be described by using a constructional example, as a reference, of the image forming system illustrated in FIG. 1.

In FIG. 1, the example in which the SFP 103 is the image forming apparatus of the downloading request source will be described. However, actually, each image forming apparatus may have units, which will be described hereinafter. Each apparatus can operate as a downloading request source and can operate as a downloading request destination. The resources are a font file, a form file, and the like.

<Description of Resource List Exchange Unit>

The schematic flow of the operations which are executed until the image forming apparatuses exchange their own resource information, request the necessary resources, and get the permission has been described with reference to FIG. 1. Therefore, first, the exchanging process of the resource information 120 which is executed as a first step by the SFP 103 and the copying apparatus 104 illustrated in FIG. 1 will be described.

Figures 4, 5:
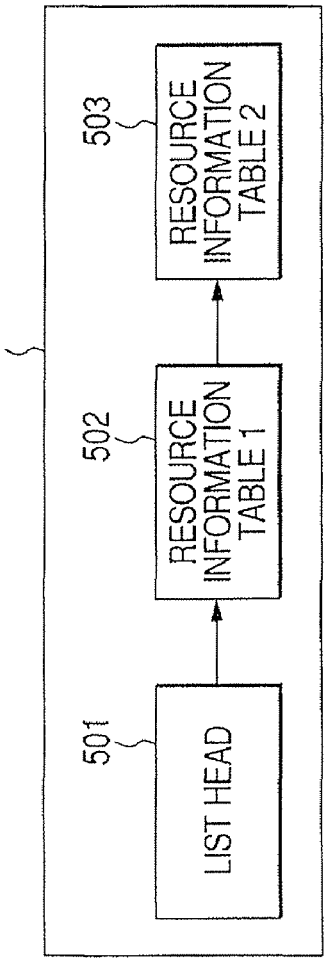
FIG. 4 is a diagram showing an example of a resource information table which is managed by the image forming apparatus showing the first embodiment.
FIG. 5 is a diagram for describing a resource information list (RIL) corresponding to each set of resource information shown in FIG. 4.

The image forming apparatus stores the individual resource information such as font data or the like held in its own apparatus into a resource information table illustrated in FIG. 4 and manages them. The resource information table is stored into one of the HD 210, RAM 203, and the like illustrated in FIG. 2. That is, in the case of rewritably and non-volatilely storing the resources, the resource information table is stored into the HD 210. In the case of temporarily storing the resources, the resource information table is held in the RAM 203. The storing device to store the resource information table is determined according to a construction of memory resources of each image forming apparatus. Particularly, since the SFP 103 among the image forming apparatuses illustrated in FIG. 1 does not have the HD as a memory resource. The resources downloaded from another image forming apparatus are held in the RAM 203. By turning off the power source, the resource main body is extinguished from the RAM 203. The information regarding the resource obtaining destination is non-volatilely held in the NVRAM area in the RAM 203. When the power source is turned on again, the information regarding the resource obtaining destination stored in the NVRAM is read out and the same resources are downloaded into the RAM 203 from the image forming apparatus designated by the obtaining destination.

FIG. 4 is a diagram showing an example of a resource information table which is managed by the image forming apparatus showing the embodiment. In the embodiment, constructing elements of a resource information table (RITAB) 400 will be described hereinbelow.

In FIG. 4, the CPU 201 stores a resource ID 401 and a resource name 402 into the table (RITAB) 400 assured in the RAM 203, thereby managing the resources.

Similarly, the CPU 201 stores a size 403, an obtaining source peer 404, and an obtaining date/time 405 into the table (RITAB) 400 assured in the RAM 203, thereby managing the resources.

Similarly, the CPU 201 stores a holding priority 406, a final access time 407, and the number of downloading times 408 into the table (RITAB) 400 assured in the RAM 203, thereby managing the resources.

The resource ID 401 is an identifier for identifying the resources which can be used as print resources held in each image forming apparatus. The resource ID 401 has a peculiar integer value every resource in the image forming apparatus.

The resource name 402 is a character string showing the resource. As a specific example, a file name is generally used. FIG. 4 shows an example in the case of "Font-A.dat".

The size 403 indicates a data size of the resource. As a specific example, a Byte size is stored.

Further, in the obtaining source peer 404, a name of the obtaining source peer at the time when the resource corresponding to the resource ID 401 has been downloaded is stored. If this field is empty, this means that the self apparatus holds original data. The name of the image forming apparatus is set as a name of the obtaining source peer.

In the obtaining date/time 405, the date and time (for example, 2005/5/10 20:04) when the resource data has been obtained from the obtaining source peer is stored.

The holding priority 406 is shown as an example in which the holding priority of the resource is set to one of the values of two levels of "High" and "Normal". However, the holding priority can be also set to one of the multivalues of three or more levels. In the case of assuring an empty area of the memory resources for storing the relevant resource, the holding priority 406 functions as a flag for deciding whether or not the resource is left in the memory resources as much as possible. That is, when the holding priority of the resource is "High", this means that a possibility that the resource is extinguished by the memory releasing process is low.

When the image forming apparatus of the resource requesting source makes the resource request, if the resource request is accompanied with the resource holding request, the CPU 201 of the image forming apparatus which manages the resources changes the holding priority from "Normal" to "High".

Further, in the final access time 407, the date and time when the downloading access has finally been made to the relevant resource are stored. In the number of downloading times 408, the number of times of the downloading operations executed for the relevant resource is stored by an integer value. The number of downloading times is counted up by the CPU 201.

As mentioned above, in the embodiment, the CPU 201 of the image forming apparatus which holds the resources refers to/updates those pieces of information in the table (RITAB) 400, thereby realizing the resource management such as exchange, deletion, and the like of the resource information.

After the information of each resource was stored by using the table (RITAB) 400 described in FIG. 4, each resource is set to a list structure, the tables are coupled, and the holding resources are managed.

FIG. 5 is a diagram for describing a resource information list (RIL) corresponding to each resource information shown in FIG. 4. This diagram shows an example in which a plurality of tables (RITAB) are managed in the RAM 203.

In FIG. 5, an information list 500 and a list head 501 of the list are illustrated. A resource information table 502 formed for the first time is linked to the list head 501. Further, a resource information table 503 formed next is linked to the information table 502. By similarly repeating such a process, the information list 500 can be formed. The information list 500 is information corresponding to the resource information 120 illustrated in FIG. 1.

Each image forming apparatus forms the resource information which could be formed by the above processes into the RAM 203 and can mutually provide the resource information of its own apparatus in response to an information providing request from the peer.

In the case of the example of the construction of the image forming system illustrated in FIG. 1, the SFP 103 transmits a resource list request message to the copying apparatus 104 and the copying apparatus 104 returns its response to the SFP 103. An embodiment in which the information list 500 is actually obtained from the peer will now be described with reference to a flowchart of FIG. 6.

Figure 6:
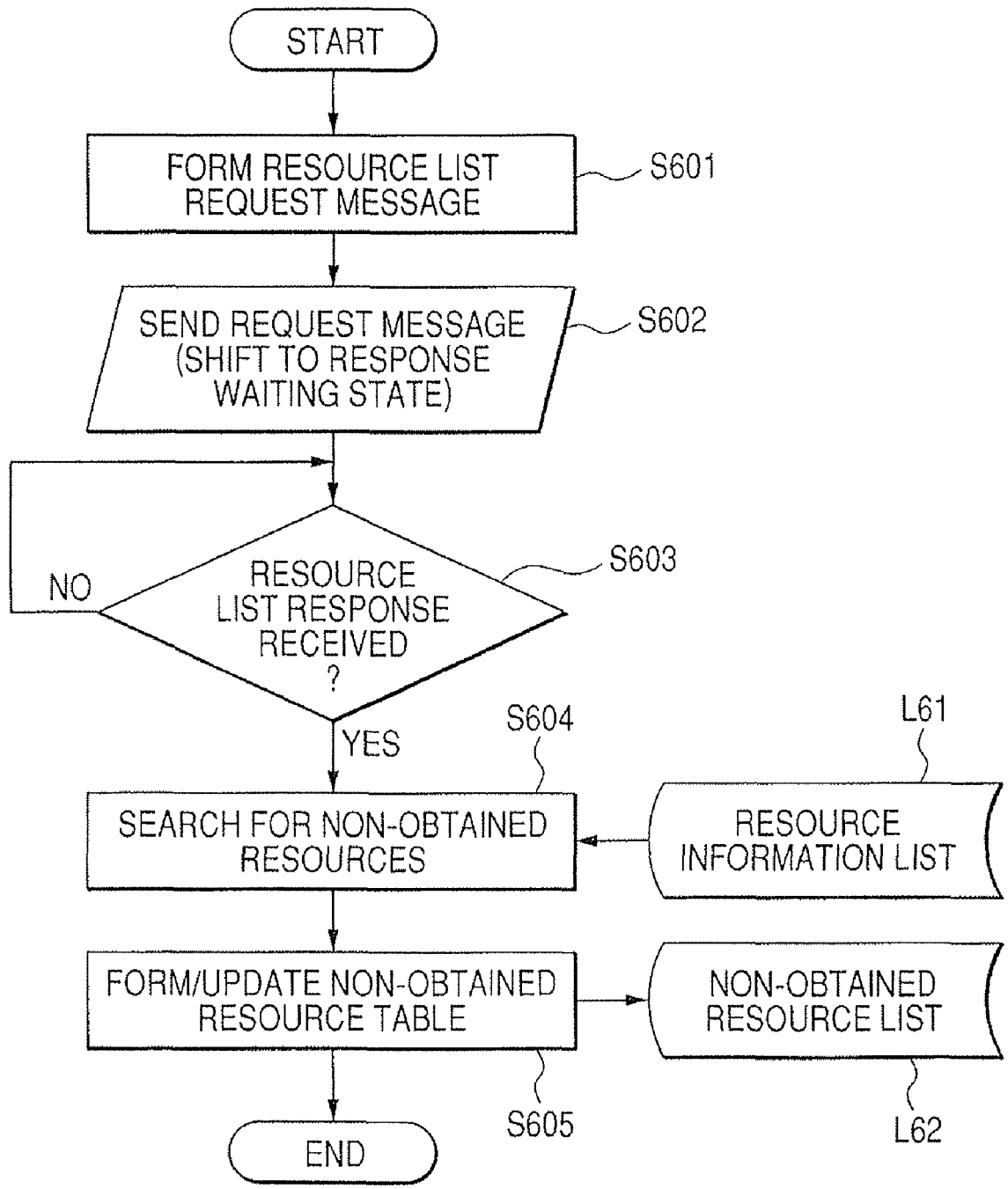
FIG. 6 is a flowchart showing an example of a first data processing procedure in the image forming apparatus showing the first embodiment.

FIG. 6 is the flowchart showing an example of a first data processing procedure in the image forming apparatus showing the embodiment. This processing procedure relates to a processing example in which the SFP 103 actually obtains the information list 500 from the peer (image forming apparatus other than its own apparatus) on the network. An example in which the copying apparatus 104 is used as a peer candidate is shown. S601 to S605 denote processing steps. Each processing step is realized by a method whereby the CPU 201 loads the control program stored in one of the ROM 202 and the HD 210 into the RAM 203 and executes the control program.

First, the SFP 103 forms the resource list request message for the copying apparatus 104 as a peer (S601). The SFP 103 transmits the request message to the copying apparatus 104 and enters a waiting state where a response of the resource list response (RIL) is returned from the copying apparatus 104 (S602).

Subsequently, the SFP 103 waits until the RIL response is received from the copying apparatus 104 (S603). When the RIL response is received from the copying apparatus 104, the SFP 103 searches for the non-obtained resources which are not held by its own apparatus from the RIL response in the reception message with reference to a resource information list L61 stored in the RAM 203 of its own apparatus (S604).

There is a case where the CPU 201 finds out the non-obtained resources from the RIL response in the reception message by the searching process.

In such a case, in response to the non-obtained resource information from the copying apparatus 104, as illustrated in FIG. 7, a non-obtained resource table (RITAB) 700 is formed in the RAM 203 and added to a non-obtained resource list L62 (S606). The present processing routine is finished.

In the case of newly adding resource information to the non-obtained resource list L62, first, the non-obtained resource table (RITAB) 700 is formed. In this instance, in the case where the resource information has been added for the first time and the case where the resource information has already been added to the non-obtained resource table (RITAB) 700, the contents of the non-obtained resource table (RITAB) are updated by the received resource information.

FIG. 7 is a diagram showing an example of the non-obtained resource table (RITAB) which is managed by the image forming apparatus showing the embodiment. This diagram relates to an example of the non-obtained resource table (RITAB) 700 which is managed by the CPU 201 of the copying apparatus 104.

As an example of the constructing elements, the CPU 201 of the copying apparatus 104 stores a resource ID 701, a resource name 702, a size 703, a holding peer name 704, and an original flag 705 into the table, thereby managing the non-obtained resources. Similarly, the CPU 201 of the copying apparatus 104 stores a holding priority 706 and a downloading status 707 into the table, thereby managing the non-obtained resources.

In the resource information table shown in FIG. 7, a description of the same elements as those in the resource information table shown in FIG. 4 is omitted here.

In the embodiment, the original flag 705 (refer to FIG. 7) showing whether or not the resources held by the partner peer are the original data exists as a new element in FIG. 7. Thus, the CPU 201 of the copying apparatus 104 can discriminate whether or not the resources are the original data.

The downloading status 707 which is used for a status management upon downloading exists in the non-obtained resource list L62. In this non-obtained resource list L62, in a manner similar to the resource information table, the tables are also coupled and managed by the list structure illustrated in FIG. 5.

The responding process on the side of the copying apparatus 104 which received the request will now be described with reference to a flowchart of FIG. 8.

FIG. 8 is the flowchart showing an example of a second data processing procedure in the image forming apparatus showing the embodiment. This processing procedure relates to a processing example in which the copying apparatus 104 side which received the resource obtaining request responds the resource information list to the peer. S801 to S803 denote processing steps. Each processing step is realized by a method whereby the CPU 201 of the copying apparatus 104 loads the control program stored in one of the ROM 202 and the HD 210 into the RAM 203 and executes the control program.

The copying apparatus 104 waits until the resource list request for its own apparatus is received from any one of the image forming apparatuses (S801). It is now assumed that the copying apparatus 104 has a memory resource for non-volatilely storing the resources and manages the management states of the resources according to the holding priority.

Now, for example, the CPU 201 of the copying apparatus 104 receives the resource list request from the SFP 103 through the NIC 204. In response to the resource list request, the CPU 201 of the copying apparatus 104 forms a resource list response message based on the resource information stored in a resource information list L81 and a non-obtained resource list L82 (S802).

The CPU 201 of the copying apparatus 104 transmits the formed response message to the peer of the requesting source (SFP 103 in the case of FIG. 1) (S803) and finishes the present processing routine.

Thus, the CPU 201 of the copying apparatus 104 can provide the resource information to the SFP 103 of the requesting source.

The exchange of the resource list between the SFP 103 and the copying apparatus 104 has been described here based on the constructional example of FIG. 1.

However, the exchange of the resource list is a process which can be executed by the image forming apparatuses which participate in the peer-to-peer network group 110.

<Description of Resource Downloading Request Unit>

Subsequently, a description will be made with respect to a resource downloading request unit for making a resource downloading request in the case where the resources are actually used based on the non-obtained resource table formed by the foregoing resource list exchange unit. More specifically speaking, the description will be made with reference to flowcharts of FIGS. 9A and 9B based on the constructional example of FIG. 1.

Figure 9B:
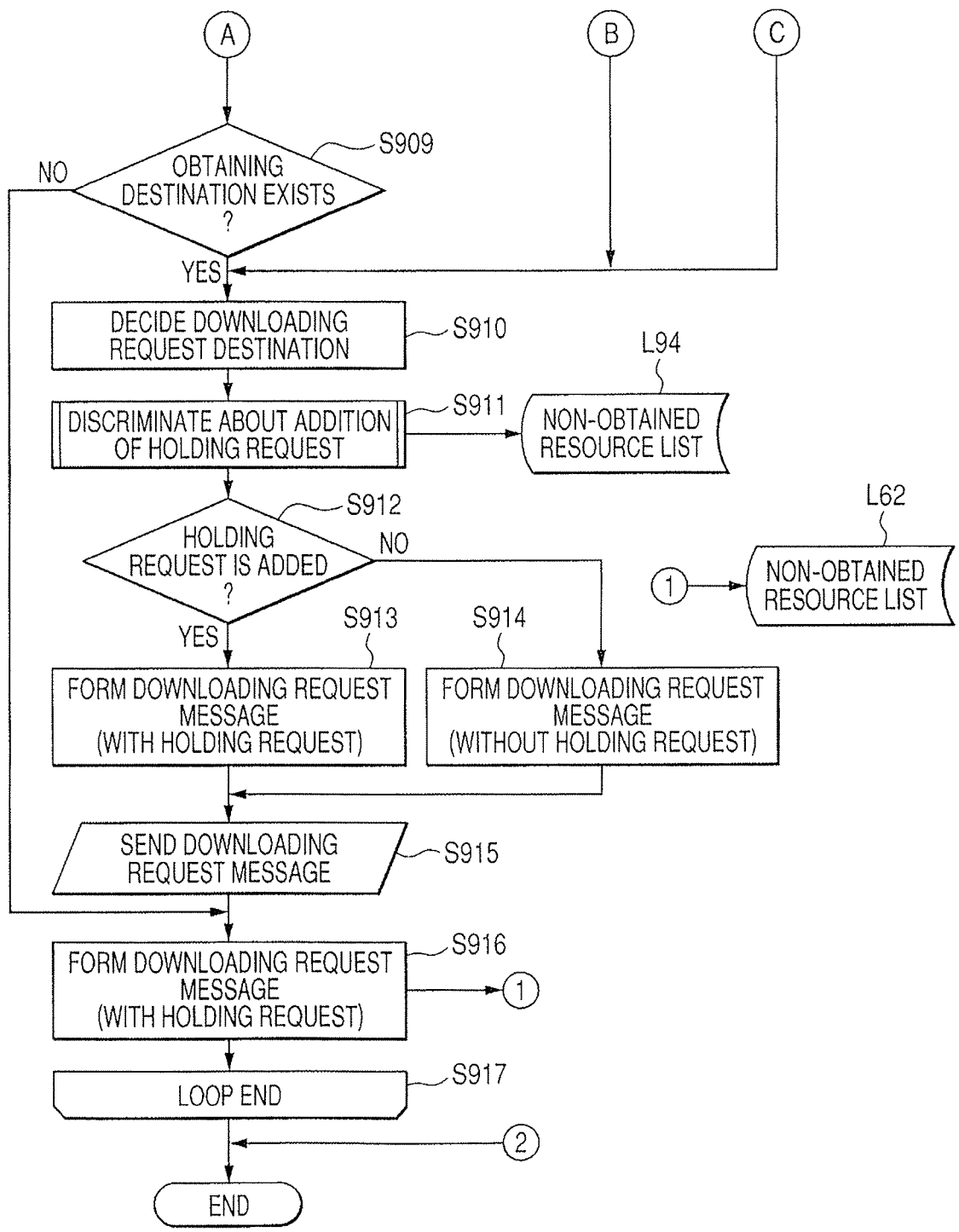
FIG. 9 is comprised of FIGS. 9A and 9B showing flowcharts for an example of a third data processing procedure in the image forming apparatus showing the first embodiment.

FIGS. 9A and 9B are the flowchart showing an example of a third data processing procedure in the image forming apparatus showing the embodiment.

This processing procedure relates to a processing example in which the resource downloading request is made in the case where the resources are actually used based on the formed non-obtained resource table.

S901 to S917 denote processing steps. Each processing step is realized by a method whereby the CPU 201 loads the control program stored in one of the ROM 202 and the HD 210 into the RAM 203 and executes the control program.

Although processes which are executed by a resource holding-approved list memory unit and a resource holding request addition discriminating unit, which will be described hereinafter, are also shown in the flowchart of FIGS. 9A and 9B, only portions of the fundamental flow for the resource downloading request will be described here.

First, in the case of using the resources, the CPU 201 of the SFP 103 confirms whether or not the necessary resources exist in its own apparatus with reference to the resource information list L91 held in the RAM 203 (S901).

The CPU 201 discriminates the presence or absence of the insufficient resources in the font or the like by searching a resource information list L91 (S902). It is assumed that the resource information list L91 has been stored in the NVRAM area in the RAM 203 of the SFP 103.

If the CPU 201 determines that the resources are insufficient, the download requesting process is executed the number of times as many as the number of insufficient resources to the image forming apparatus which holds the resources. Therefore, the CPU 201 advances the processing routine to the head of a processing loop for deciding the obtaining destination of the insufficient resources (S903). This processing loop includes S903 to S917.

The CPU 201 of the SFP 103 searches for the peer (obtaining destination) having the insufficient resources from a non-obtained resource list L93 held in the RAM 203 with reference to a holding-approved resource list L92 (S904).

The CPU 201 of the SFP 103 discriminates the presence or absence of the holding-approved obtaining destination (S905). If the CPU 201 determines that the peer having the relevant resources could be found out by the searching process, the processing routine advances to S910.

If it is determined in S905 that the holding-approved obtaining destination does not exist, the CPU 201 searches for the obtaining destination having the insufficient resources with reference to the non-obtained resource list L93 (S906). Whether or not the obtaining destination whose priority (corresponding to the holding priority 706 illustrated in FIG. 7) is "High" exists is discriminated in S907. If it is determined in S907 that the obtaining destination whose priority is "High" exists, the obtaining destination is added to the holding-approved resource list L92 (S908). The processing routine advances to S910.

If it is determined in S907 that the obtaining destination whose priority is "High" does not exist, S909 follows and the CPU 201 discriminates the presence or absence of the obtaining destination having the insufficient resources. If the CPU 201 determines in S909 that there is no obtaining destination having the insufficient resources, S916 follows.

If it is determined in S907 that the obtaining destination exists, the processing routine advances to S910. In S910, the downloading request destination is determined to be the peer (in FIG. 1, the MFP 102 is a constructional example of the downloading request destination).

Subsequently, a holding request addition discriminating process, which will be described in detail hereinafter, is executed in S911. This is because the downloaded resources in the RAM 203 of the SFP 103 are extinguished in response to the turn-off of the power source. Therefore, another image forming apparatus (peer) holding the resources which are used is requested to hold the necessary resources so as not to freely erase the necessary resources.

In S912, the CPU 201 of the SFP 103 discriminates whether or not the resource holding request is added to the downloading request by searching a non-obtained resource list L94.

If the CPU 201 of the SFP 103 determines that the holding request is not added, the CPU 201 of the SFP 103 forms a downloading request message without the holding request (S914). The processing routine advances to S915 and the NIC 204 transmits the downloading request message to the MFP 102.

Finally, the downloading status 707 in the table of the non-obtained resource list L62 illustrated in FIG. 7 is updated and S917 follows.

If the insufficient resources still exist in the terminating process of the loop in S917, the processing routine is returned to the head of the loop of S903. By repeating the similar processes, the downloading request can be made for the necessary resources.

If it is determined in S917 that the insufficient resources do not exist, the present processing routine is finished.

If it is determined in S912 that the holding request is added, the CPU 201 of the SFP 103 forms a downloading request message with the holding request (S913). The processes of S915 to S917 are similarly executed.

<Description of Resource Holding Request Adding Unit>

The fundamental process for requesting the downloading by the resource downloading request unit has been described above. A resource holding request adding unit for adding the resource holding request to the resource downloading request will be further described with reference to the flowchart of FIGS. 9A and 9B.

As already described in the paragraphs of the resource downloading request unit, the downloading request destination is determined in S910 (in the constructional example of FIG. 1, it is decided to be the MFP 102). After that, the SFP 103 discriminates whether or not the holding of the resources is requested to the MFP 102 as a downloading request destination (S911).

If it is determined that the holding request is added to the downloading request destination (S912), the downloading request message including the holding request is formed (S913) and transmitted to the MFP 102 (S915). The downloading request message corresponds to the downloading request 130 illustrated in FIG. 1.

Since a processing unit for discriminating whether or not the resource holding request is made will be described hereinafter in a description of a resource holding request addition discriminating unit, its description is omitted here.

Since the resource holding request adding process is added, by adding the resource holding request to the downloading request message and transmitting the message, it is possible to request the peer of the downloading request destination to hold the resources.

<Description of Resource Holding Priority Changing Unit>

Subsequently, with reference to FIGS. 10A, 10B and 4, a description will be made with respect to a resource holding priority changing unit for changing the resource holding priority by the peer (in the constructional example of FIG. 1, the MFP 102) which received the resource downloading request added with the resource holding request.

First, a flow of processes which are executed until the MFP 102 which received the downloading request including the resource holding request from the SFP 103 changes the priority will be described with reference to FIGS. 10A and 10B. It is assumed that the priority has been stored as a state of the holding priority 406 in the table (RITAB) 400 illustrated in FIG. 4 and the CPU 201 of the MFP 102 can refer to the priority.

Figure 10B:
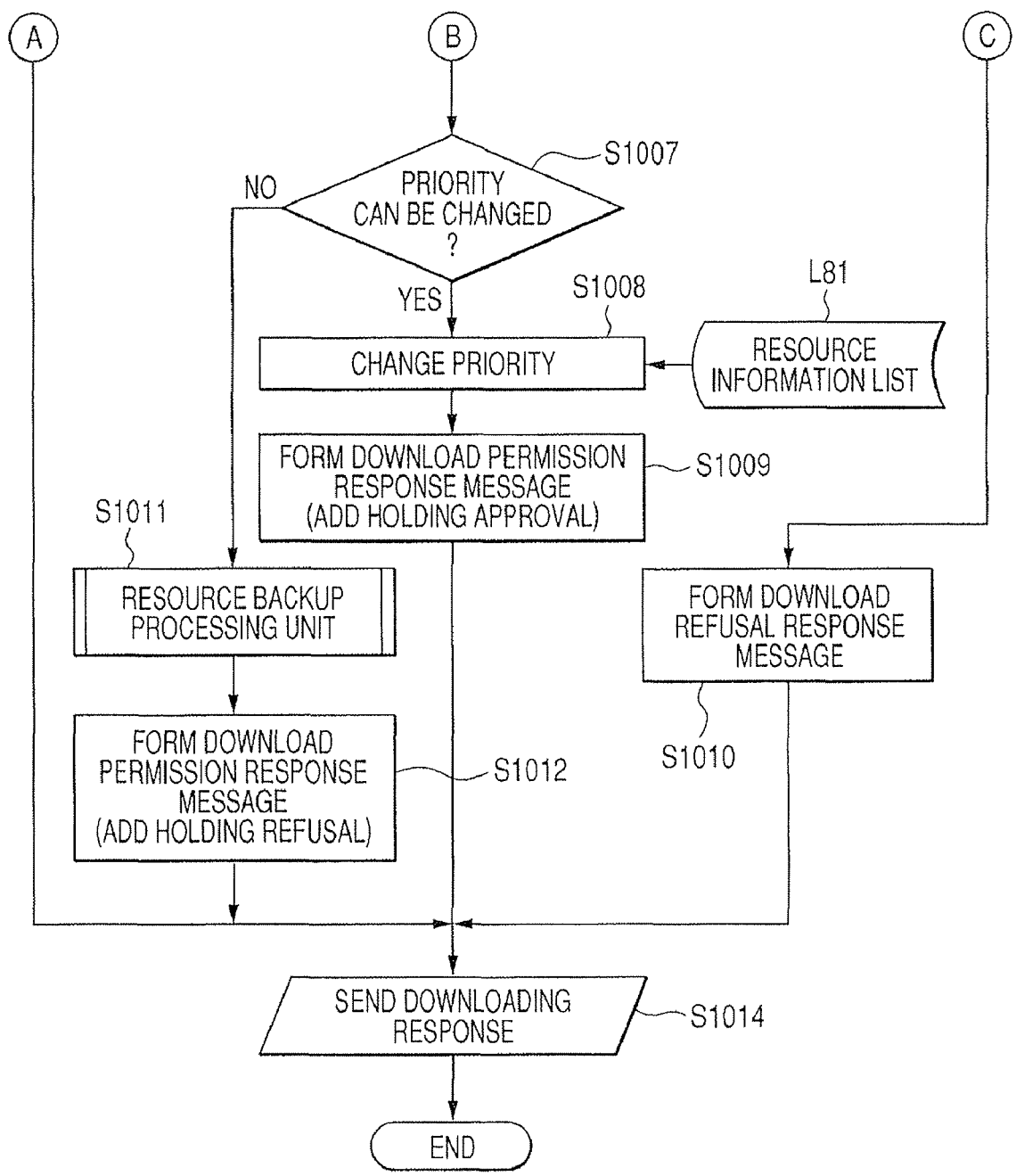
FIG. 10 is comprised of FIGS. 10A and 10B showing flowcharts for an example of a fourth data processing procedure in the image forming apparatus showing the first embodiment.

FIGS. 10A and 10B are flowcharts showing an example of a fourth data processing procedure in the image forming apparatus showing the embodiment. This processing routine relates to an example of a resource holding priority changing process for changing the resource holding priority by the image forming apparatus which received the resource holding request from another image forming apparatus. An example of the resource holding priority changing process in the case where the MFP 102 received the resource holding request from the SFP 103 will be described here.

S1001 to S1014 denote processing steps. Each processing step is realized by a method whereby the CPU 201 loads the control program stored in one of the ROM 202 and the HD 210 into the RAM 203 and executes the control program.

First, the MFP 102 waits until the downloading request from another image forming apparatus (from the SFP 103 here) on the network is received (S1001). When the MFP 102 receives the downloading request, the resources held by its own apparatus are confirmed with reference to the resource information list L81 (S1002). The resource information list L81 has been stored in the HD 210 or the like and is referred to by the CPU 201 in the state where the list L81 has been loaded into the RAM 203 of the MFP 102.

The CPU 201 discriminates whether or not the apparatus has the resources requested by the SFP 103 (S1003). If the CPU 201 determines that the apparatus does not have the resources requested by the SFP 103, S1010 follows. A download refusal response message is formed and the processing routine advances to S1014.

If it is determined in S1003 that the apparatus has the resources requested by the SFP 103, S1004 follows. Whether or not the resource holding request is included in the request message for the resources requested by the SFP 103 is confirmed (S1004).

If the CPU 201 of the MFP 102 determines that the resource holding request from the SFP 103 is included in the request message, the MFP 102 executes a resource list priority optimizing process (S1005). Subsequently, whether or not the holding priority can be changed is discriminated with reference to a resource area management table 1400 (S1006).

Since the resource list priority optimizing process in S1005 is not an essential process, a description will be made hereinbelow on the assumption that the processing routine advances from S1004 to S1006. Details of the resource list priority optimizing process in S1005 will be described in a description regarding a resource holding priority optimizing unit.

In S1007, whether or not the holding priority can be changed is discriminated with reference to the non-obtained resource list L82. Details of this discriminating process will be described with reference to FIGS. 11 and 12.

Figures 11, 12:
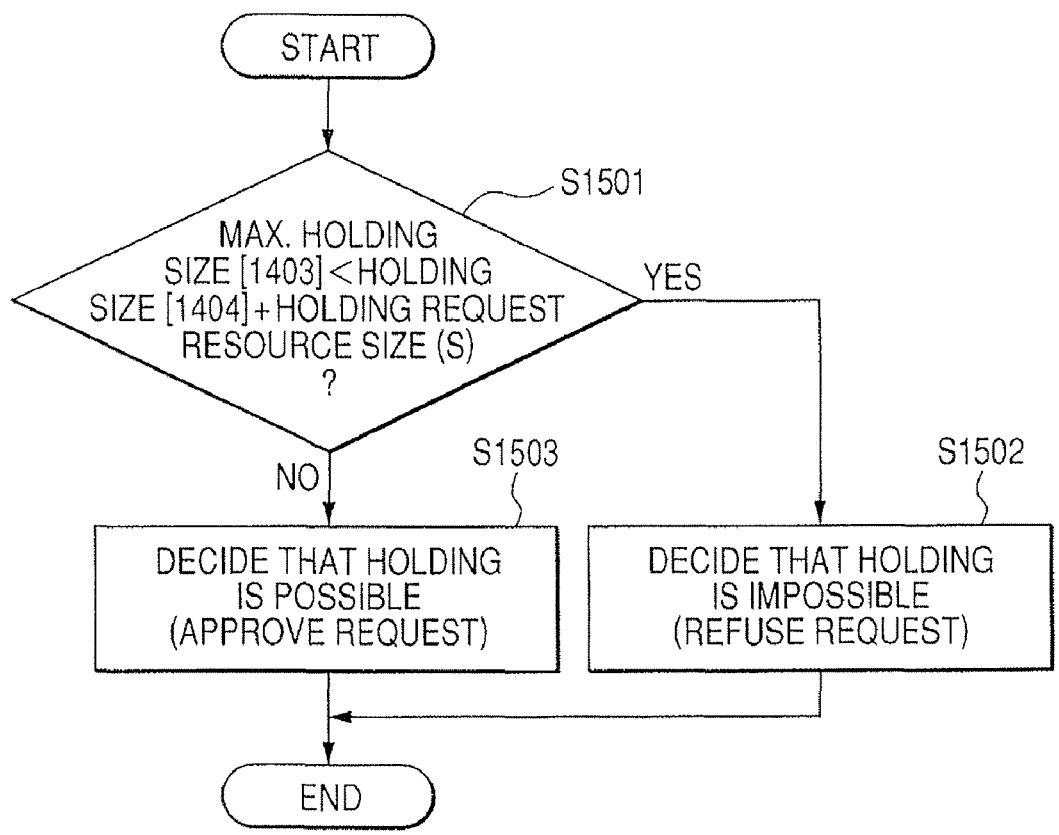
FIG. 11 is a diagram showing an example of a resource area management table for managing resource areas in the image forming apparatus showing the first embodiment.
FIG. 12 is a flowchart showing an example of a fifth data processing procedure in the image forming apparatus showing the first embodiment.

FIG. 11 is a diagram showing an example of a resource area management table for managing resource areas in the image forming apparatus showing the embodiment.

In FIG. 11, the non-obtained resource list L82 is constructed by four elements of a downloading area size 1401, a use size 1402, a maximum holding size 1403, and a holding size 1404. The non-obtained resource list L82 has been stored into the HD 210 or the like. The non-obtained resource list L82 is loaded into the RAM 203 and can be referred to by the CPU 201. In the case of the image forming apparatus which does not have the non-volatile HD 210, the resource area is constructed as an NVRAM area in the RAM 203.

In the downloading area size 1401, the whole size of the area for storing the resource data is stored. In the use size 1402, a total amount of the resources in the area in which the resources have actually been stored and which is being used is stored.

In the maximum holding size 1403, the maximum size of the area in which the holding priority is raised and the resources can be stored in the downloading area size 1401 is stored. The maximum holding size 1403 is used when discriminating whether or not the holding priority of the resource to which the holding request has newly been issued can be raised.

In the holding size 1404, a total amount of the resources which have actually been stored by raising the holding priority is stored.

As for the setting of the maximum holding size 1403, the administrator of the image forming apparatus can set by inputting a proper numerical value onto a setting display screen (not shown) by using various buttons, the touch panel 206, or the like provided for the MFP. The non-obtained resource list L82 is formed/managed by each of the image forming apparatuses which hold the resources (in the construction of FIG. 1, the MFPs 101 and 102, SFP 103, and copying apparatuses 104 and 105).

A flow for processes for discriminating whether or not the holding priority of the resource to which the holding request has newly been issued can be raised by using the non-obtained resource list L82 will now be described with reference to the constructional example of FIG. 1 and a flowchart of FIG. 12.

FIG. 12 is a flowchart showing an example of a fifth data processing procedure in the image forming apparatus showing the embodiment. This processing procedure relates to an example of the resource holding priority changing process for changing the resource holding priority.

S1501 to S1503 denote processing steps. Each processing step is realized by a method whereby the CPU 201 loads the control program stored in one of the ROM 202 and the HD 210 into the RAM 203 and executes the control program.

The MFP 102 to which the resource holding has newly been requested by the SFP 103 discriminates whether or not a value obtained by adding the holding size 1404 of the resources which have already been held by raising the holding priority at present to a size S of the requested resource is larger than the maximum holding size 1403 (S1501).

If the MFP 102 determines that the addition value exceeds the maximum holding size 1403, it is decided that the holding priority cannot be raised (the holding is impossible) (S1502) and the processing routine is finished.

If it is determined in S1501 that the addition value does not exceed the maximum holding size 1403, since the holding priority can be raised, the MFP 102 determines that the resource file can be held (S1503). The present processing routine is finished.

Thus, by storing the held resources and setting the priority to "High" in the resource area assured in the MFP 102, another image forming apparatus can download the resources after that.

Processes after S1007 shown in FIGS. 10A and 10B will now be described.

The CPU 201 of the MFP 102 discriminates whether or not the priority can be changed from a result of the discriminating process of S1006 according to the procedure shown in FIG. 12 mentioned above (S1007).

If it is determined in S1007 that the priority cannot be changed, a resource backup process can be also executed in S1011. However, since the resource backup process is not an essential process and will be described in the description regarding a resource backup unit hereinafter, its description is omitted here.

If it is determined that the priority for the held resources can be changed, the MFP 102 changes the priority in the holding priority 406 in the resource information table (FIG. 4) of the resource information list L81 to "High" (S1008).

Thus, the MFP 102 can raise the holding priority for the resource whose holding has been requested by the SFP 103. When the resource area is insufficient, such a resource is eliminated from erasure targets and can be held. That is, when the power source is turned on again, a probability that the SFP 103 can obtain the same resource from the MFP 102 rises and usability for the user's resource downloading request is improved.

<Description of Resource Holding Response Adding Unit>

Subsequently, after the priority was changed in response to the resource holding request, the MFP 102 transmits a download permission response added with the resource holding response to the peer of the download requesting source (SFP 103 in FIG. 1). A resource holding response adding unit will be described hereinbelow with reference to FIGS. 10A and 10B.

As mentioned above, if it is determined in S1007 that the priority can be changed, the MFP 102 changes the priority in the holding priority 406 in the resource information table (FIG. 4) of the resource information list L81 to "High" (S1008). After that, a download permission response message added with the holding approval is formed (S1009).

The formed download permission response message is transmitted to the SFP 103 as a requesting source peer (S1014). The processing routine is finished.

If it is determined in S1007 that the priority cannot be changed, the resource backup process is executed and S1012 follows.

In S1012, the download permission response message added with the holding refusal is formed. The download response is transmitted to the SFP 103 (S1014).

Thus, a response showing whether or not the holding is possible is added and a response to the downloading request can be returned to the SFP 103 serving as a peer on the resource downloading request source side.

<Description of Resource Holding-Approved List Memory Unit>

Figure 13:
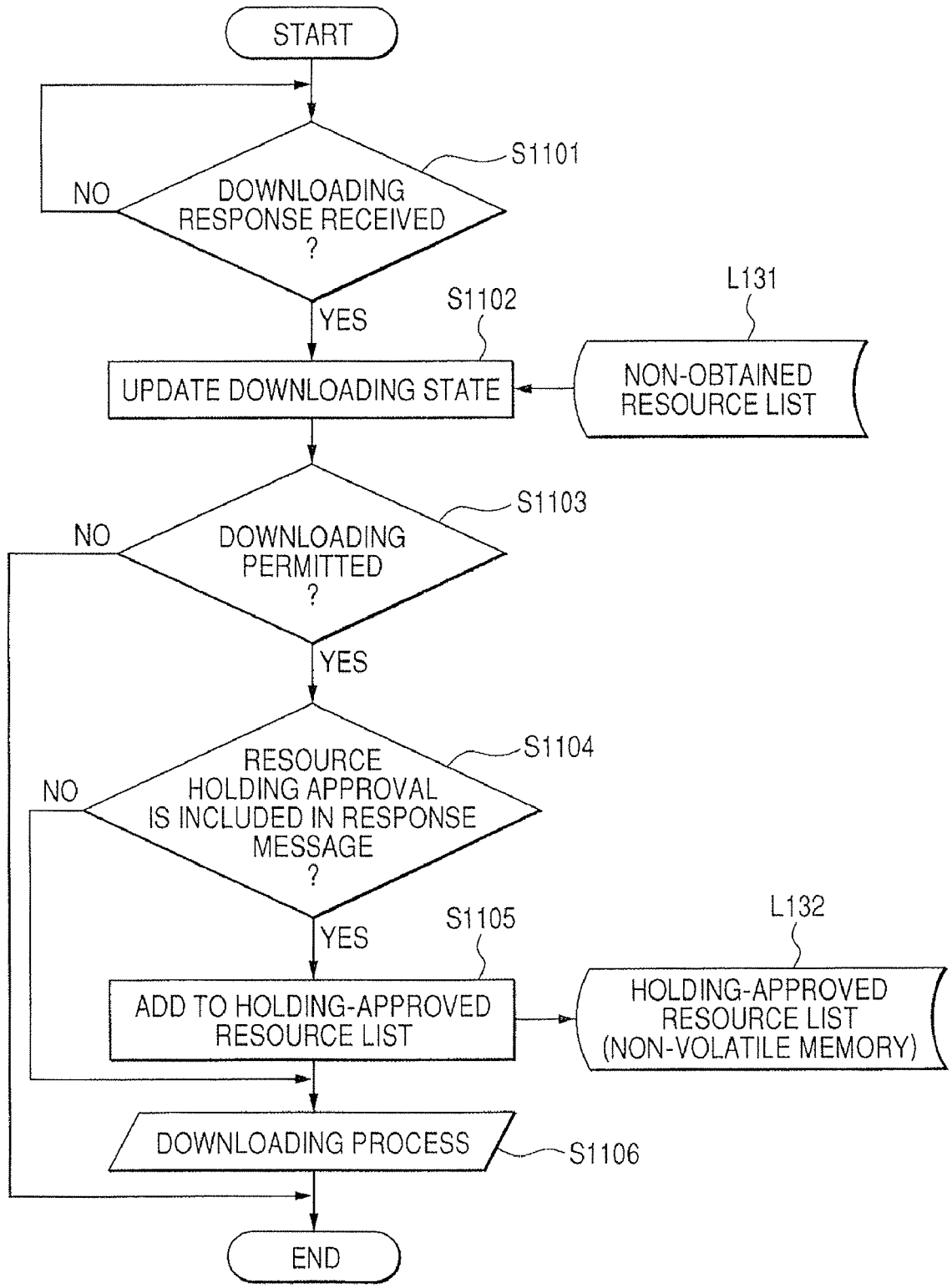
FIG. 13 is a flowchart showing an example of a sixth data processing procedure in the image forming apparatus showing the first embodiment.

With reference to FIG. 13, a description will be made with respect to a resource holding-approved list memory unit for storing the holding-approved resource information into a non-volatile memory in the case where the response to the resource downloading request is received and the holding is approved. The non-volatile memory is a memory which does not have the HD in a manner similar to the SFP 103 and is a small storing area assured in the NVRAM area in the RAM 203. All of the resources to be downloaded cannot be stored in such a memory.

FIG. 13 is a flowchart showing an example of a sixth data processing procedure in the image forming apparatus showing the embodiment. This processing procedure relates to an example of processes which are executed until the response to the resource downloading request is received and, when the holding has been approved, the resource holding-approved list for storing the holding-approved resource information into the non-volatile memory is stored. S1101 to S1106 denote processing steps. Each processing step is realized by a method whereby the CPU 201 loads the control program stored in one of the ROM 202 and the HD 210 into the RAM 203 and executes the control program.

First, the SFP 103 waits until the downloading response is received from the MFP 102 (S1101). When the downloading response is received from the MFP 102, a downloading status in the table of a resource information list L131 is updated based on the downloading response (S1102).

Subsequently, from the downloading response, the SFP 103 confirms whether or not the downloading has been permitted (S1103). If it is determined that the downloading has been permitted, whether or not a resource holding approval has been added to the response message is confirmed (S1104).

If the CPU 201 of the SFP 103 determines that the holding approval has been included, the non-obtained resource table 700 is added to a holding-approved resource list L132 (S1105). The non-volatile memory corresponds to the NVRAM area assured in the RAM 203.

Subsequently, the SFP 103 executes the downloading process of the resources whose holding has been permitted by the MFP 102 (S1106). The present processing routine is finished. Although the downloaded resources are temporarily held in the resource area in the RAM 203, when the power source of the SFP 103 is turned off, the resources are also simultaneously extinguished.

As mentioned above, in the embodiment, the SFP 103 stores the holding-approved resource list L132 for the resource information whose holding has been approved by the MFP 102 into the non-volatile memory. As specific information, information to specify the held resources and address information to specify the apparatus which approved the holding of the resources are stored into the holding-approved resource list L132.

Thus, if it is necessary to download the same resources after the power source was turned on again, they are searched for from the holding-approved resource list L132 stored in the non-volatile memory in the SFP 103.

It is possible to immediately decide that it is the MFP 102, which is a peer to which the resources can be certainly downloaded.

A procedure in the case of transmitting the downloading request by using the holding-approved resource list L132 stored in the non-volatile memory in the SFP 103 will be described hereinbelow with reference to the flowchart of FIGS. 9A and 9B.

The fundamental downloading request transmitting unit has already been described in the description of the resource downloading request unit by using the flowchart of FIGS. 9A and 9B. Therefore, only a processing flow for deciding the downloading request destination by using the specific information (address information to specify the resource holding apparatus) stored in the holding-approved resource list described above will be described hereinbelow.

To decide the obtaining destination of the insufficient resources, before searching for the peer having the insufficient resources from the non-obtained resource list L93 in S906, the SFP 103 executes the following processes. First, whether or not the insufficient resources exist in the peer in the list is discriminated with reference to the holding-approved resource list L92 (S904). If the holding-approved obtaining destination can be found out from the holding-approved resource list L92 (S905), the downloading request destination is determined to be the peer (MFP 102 in the constructional example of FIG. 1) at that point of time (S910). If the holding-approved obtaining destination cannot be found out, the already-described process, as a normal searching procedure, for searching for the peer having the insufficient resources from the non-obtained resource list L93 is executed. The holding-approved resource list L92 and the holding-approved resource list L132 are the same.

<Description of Resource Holding Request Addition Discriminating Unit>

Subsequently, the resource holding request addition discriminating unit for discriminating whether or not the resource holding request should be added when the downloading request is made will now be described with reference to FIGS. 14 and 15.

FIG. 14 is a diagram for describing a construction of a holding request condition setting table for storing condition setting values which are used for the image forming apparatus showing the embodiment to discriminate whether or not the holding request is added.

In FIG. 14, in the embodiment, a holding request condition setting table 1300 is constructed by elements of an HDD condition 1301, a holding number condition 1302, and an original holding peer existence condition 1303.

If the HDD condition 1301 has been set to "Enable (valid)" here, whether or not the HDD (corresponding to the large-scale storing device 210) has been loaded is used for the condition discrimination. If the HDD condition 1301 has been set to "Disable (invalid)", this discrimination is not made.

In the holding number condition 1302, how many image forming apparatuses having the same resources as the download-requested resources exist in the same LAN is used for the condition discrimination. As for the setting value, for example, now assuming that a numerical value "4" has been set, it is determined that when the number of image forming apparatuses having the same resources is equal to 4 or less, the holding is requested.

If the holding number condition 1302 is "Disable (invalid)", the value is set to "0".

If the original holding peer existence condition 1303 has been set to "Enable (valid)", whether or not the image forming apparatus having the original data of the resources exists in the same LAN is used for the condition discrimination.

Although the number of resource holding apparatuses existing in the same LAN and the existence of the original data holding apparatus have been used as discrimination factors in the embodiment, as another embodiment, such a discrimination can be also similarly made by using the existence in the same peer group as a reference.

It is also possible to construct in such a manner that only when the image forming apparatus having the original data of the resources whose downloading is necessary exists at a position beyond the router, the discrimination about the resource holding request addition for adding the resource holding request and requesting the downloading is made.

Figure 15:
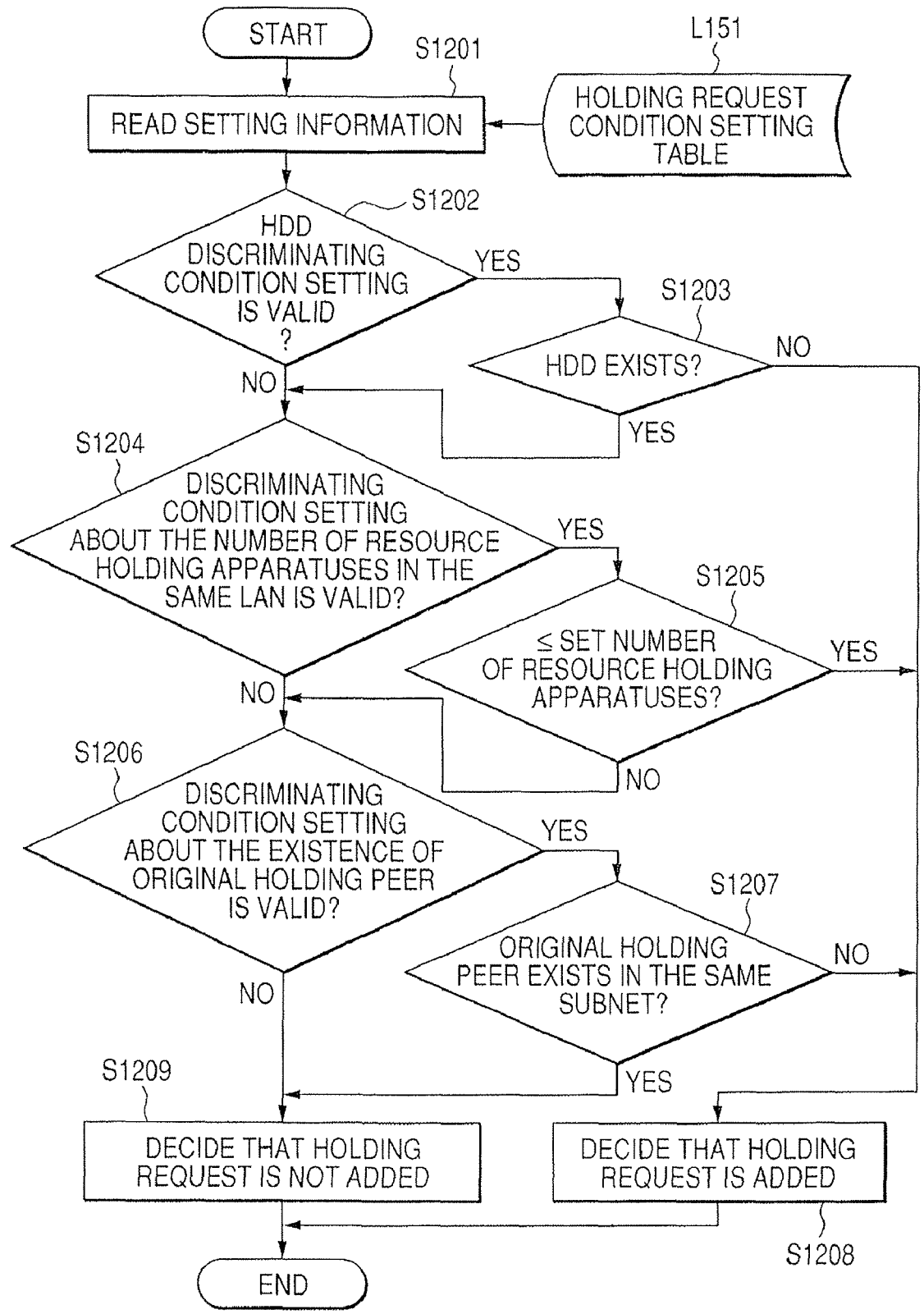
FIG. 15 is a flowchart showing an example of a seventh data processing procedure in the image forming apparatus showing the first embodiment.

FIG. 15 is a flowchart showing an example of a seventh data processing procedure in the image forming apparatus showing the embodiment. This processing procedure relates to a processing example for discriminating whether or not the resource holding request is added. S1201 to S1209 denote processing steps. Each processing step is realized by a method whereby the CPU 201 loads the control program stored in one of the ROM 202 and the HD 210 into the RAM 203 and executes the control program.

First, the CPU 201 of the SFP 103 reads out the setting information in a holding request condition setting table L151 (S1201) illustrated in FIG. 14 and confirms whether or not the HDD discriminating condition is valid (S1202).

Subsequently, the CPU 201 of the SFP 103 discriminates whether or not the HDD discriminating condition is valid (S1202). If it is determined in S1202 that the HDD discriminating condition is valid, the CPU 201 of the SFP 103 confirms the presence or absence of the HDD (S1203). If it is determined in S1203 that the HDD does not exist, the CPU 201 of the SFP 103 decides that the holding request is added (S1208). The present processing routine is finished. Although the existence of the HDD has been confirmed in S1203, it is also possible to compare a capacity of the resources to be downloaded with an empty capacity of the non-volatile memory and confirm whether or not the resources to be downloaded can be stored into the non-volatile memory. In this instance, if it is decided that the resources to be downloaded cannot be stored into the non-volatile memory, it is determined that the holding request is added.

If it is decided in S1202 that the setting is invalid or if it is determined in S1203 that the HDD exists, S1204 follows. In S1204, the CPU 201 of the SFP 103 confirms whether or not the condition of the number of resource holding apparatuses in the same LAN is valid as a next condition (S1204). If the CPU 201 of the SFP 103 decides in S1204 that the condition is valid, whether or not the number of apparatuses having the same resources which exist in the same LAN is equal to or less than a set value (S1205).

If the CPU 201 of the SFP 103 decides in S1205 that the number of resource holding apparatuses is equal to or less than the set value, it is determined that the holding request is added (S1208). The present processing routine is finished.

If it is determined in S1204 that the setting is invalid or if it is determined in S1205 that the number of resource holding apparatuses is larger than the set value, S1206 follows.

In S1206, the CPU 201 of the SFP 103 confirms whether or not the setting about the presence or absence of the original holding peer in the same LAN is valid as a next condition (S1206).

If the CPU 201 of the SFP 103 determines in S1206 that the setting is valid, the CPU 201 of the SFP 103 confirms whether or not the original holding peer exists in the same LAN (S1207). If the CPU 201 of the SFP 103 determines in S1207 that the original holding peer does not exist in the same LAN (if it is decided that the original holding peer exists at the position beyond the router), it is determined that the holding request is added (S1208). The present processing routine is finished. The "original holding peer" mentioned here corresponds to the MFP-1 (101) in the example of FIG. 1 and indicates the apparatus which holds the original resources. If the MFP-1 (101) exists in the router, even if the resources cached in the MFP-2 (102) are deleted, since those resources can be downloaded at a high speed from the MFP-1 (101), the holding request is not made to the MFP-2 (102). On the other hand, if the MFP-1 (101) exists out of the router, when the resources cached in the MFP-2 (102) are deleted, if the resources are downloaded from the MFP-1 (101), there is a case where it takes a long time. Therefore, the holding request is made to the MFP-2 (102).

If the CPU 201 of the SFP 103 determines in S1206 that the setting is invalid or the CPU 201 decides in S1207 that the original holding peer exists in the same LAN, it is determined that the holding request is not added (S1209). The present processing routine is finished.

A result of discrimination about whether or not the resource-holding peer exists in the same LAN can be known by making communication in which the number of hops (TTL) of the router has been designated by a peer-to-peer communicating method, since it is not an essential process according to the feature of the invention, its description is omitted here.

"TTL" mentioned here denotes an "existence time" which can be designated in an IP packet header. However, actually, "TTL" is not the time but denotes "the number of hops". That is, the TTL has a function of designating the number of hops in which the packet can "exist".

<Description of Resource Holding Priority Optimizing Unit>

The flow for the processes which are executed until the MFP 102 receives the downloading request including the resource holding request and changes the priority has already been described with reference to FIGS. 10A and 10B in the description about the resource priority changing unit.

With reference to a flowchart of FIG. 16, a description will be made with respect to a resource list priority optimizing unit (process in S1005 in the flowchart of FIGS. 10A and 10B) in which when the resource holding request is included in the request message, the MFP 102 resets and updates the holding priority of each resource in the resource list, thereby enabling the resources whose holding has newly been requested to be approved as much as possible.

Figure 16:
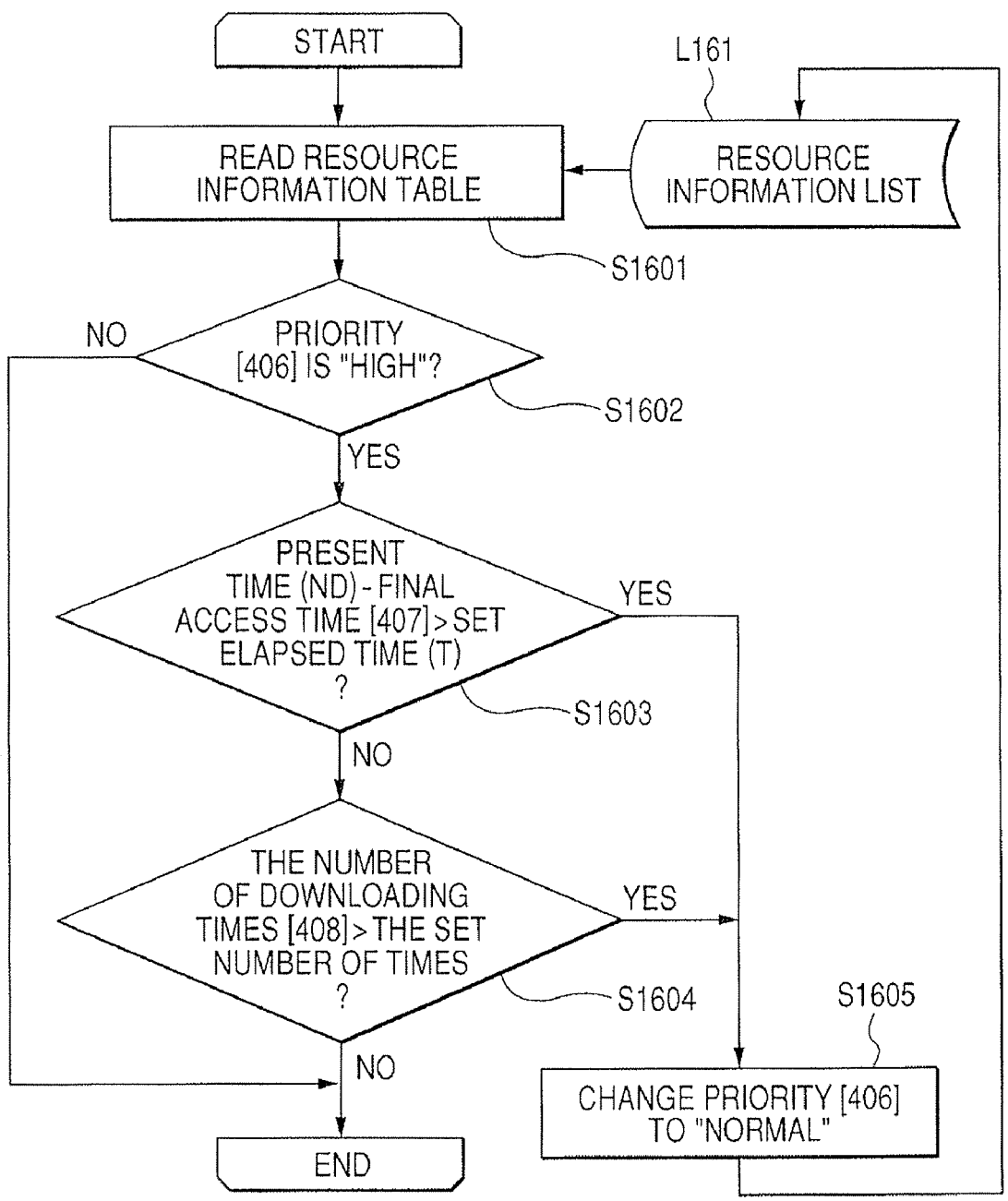
FIG. 16 is a flowchart showing an example of an eighth data processing procedure in the image forming apparatus showing the first embodiment.

FIG. 16 is a flowchart showing an example of an eighth data processing procedure in the image forming apparatus showing the embodiment. This processing procedure relates to a detailed processing example of the resource list priority optimizing process in S1005 shown in FIGS. 10A and 10B. S1601 to S1605 denote processing steps. Each processing step is realized by a method whereby the CPU 201 loads the control program stored in one of the ROM 202 and the HD 210 into the RAM 203 and executes the control program.

First, when there is a resource holding request (request 130 transmitted from the SFP 103 to the MFP 102 in the construction of FIG. 1), the MFP 102 reads the first resource information table from a resource information list L161 (S1601). Whether or not the holding priority 406 is high (High) is confirmed (S1602).

If it is decided in S1602 that the holding priority 406 is high, an elapsed time from the final access time is calculated and whether or not the elapsed time exceeds a set elapsed time T is discriminated (S1603). If it is decided in S1603 that the elapsed time exceeds the set elapsed time T, the holding priority 406 in the resource information table in the resource information list L161 is changed to a lower priority of "Normal" (S1605).

In S1603, the elapsed time from the final access time is calculated and if it is decided that the elapsed time does not exceed the set elapsed time T, whether or not the number of downloading times as a next condition exceeds the set number of times is discriminated (S1604). If it is decided in S1604 that the number of downloading times 408 exceeds the set number of times (N), S1605 follows and the holding priority 406 is changed to the lower priority.

If it is decided in S1604 that the number of downloading times 408 does not exceed the set number of times (N), a priority resetting process for the resource is finished (returned) and a similar priority resetting process is executed to the next resource.

By executing the priority resetting process to all of the resources registered in the resource information list, it becomes possible to lower the priority of the resource whose priority may be lowered such that the new holding request may be approved.

<Description of Resource Backup Unit>

The flow for processes which are executed until the downloading request including the resource holding request is received and the priority is changed has already been described in the description about the resource priority changing unit with reference to FIGS. 10A and 10B.

A resource backup unit for backing up the resource into another image forming apparatus (process of S1011 in the flowchart shown in FIGS. 10A and 10B) in the case where the holding priority of the holding-requested resource cannot be changed will now be described hereinbelow with reference to a flowchart of FIG. 17.

Figure 17:
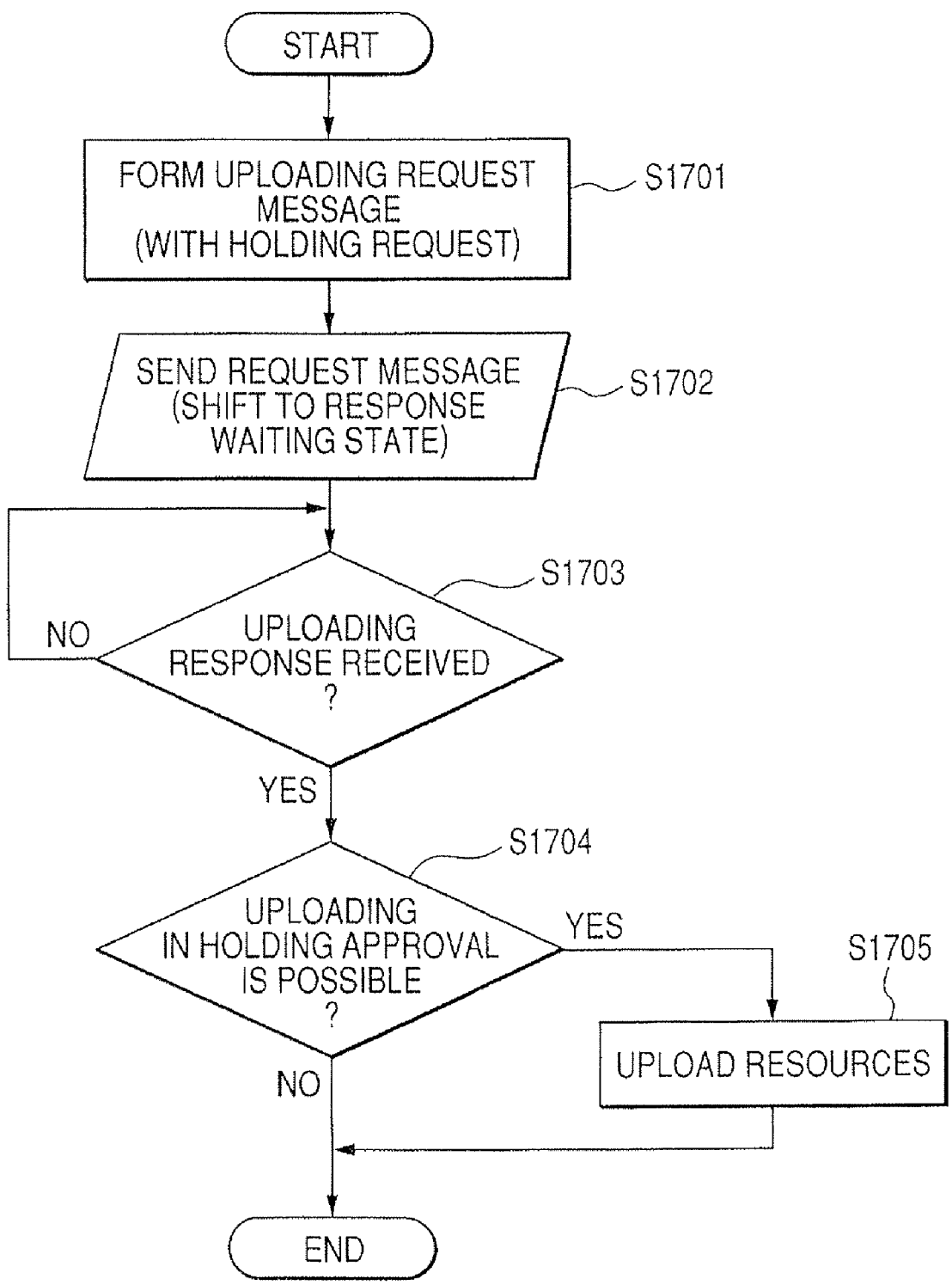
FIG. 17 is a flowchart showing an example of a ninth data processing procedure in the image forming apparatus showing the first embodiment.

FIG. 17 is a flowchart showing an example of a ninth data processing procedure in the image forming apparatus showing the embodiment. This processing procedure relates to a detailed processing example of the resource list priority optimizing process in S1005 shown in FIGS. 10A and 10B. S1701 to S1705 denote processing steps. Each processing step is realized by a method whereby the CPU 201 loads the control program stored in one of the ROM 202 and the HD 210 into the RAM 203 and executes the program.

First, in order to upload the resources to another image forming apparatus, the MFP 102 selects the adjacent image forming apparatus from the neighboring peers existing in the peer group to which its own apparatus belongs.

First, an uploading request message to the selected peer (for example, the copying apparatus 104 is considered in the construction of FIG. 1) is formed (S1701). The uploading request message is transmitted to the copying apparatus 104 (S1702).

Since a processing procedure of the uploading response of the image forming apparatus which received the uploading request (copying apparatus 104 in the construction of FIG. 1) is almost similar to the processing procedure of the downloading response described in FIGS. 10A and 10B, its description is omitted here.

Subsequently, the MFP 102 waits until the uploading response to the uploading request is received from the copying apparatus 104 (S1703). When the uploading response is received from the copying apparatus 104, the MFP 102 confirms whether or not the holding-approved uploading has been approved (S1704).

Only when it is determined that the uploading has been approved, the MFP 102 executes the resource uploading process (S1705). The present processing routine is finished.

If it is determined in S1704 that the uploading is not approved, another adjacent peer is selected again and the processes of S1701 to S1705 are repeated again.

Thus, the peer which approves the holding can be searched for and the target resources can be uploaded. The resources which could not be held by its own apparatus can be held by another image forming apparatus.

As for the uploading condition, there is a case where the holding priority of the download target resource cannot be set to "High" by the SFP 103 in response to the downloading request accompanied with the resource holding request. Therefore, it is also possible to control in such a manner that the MFP 102 transfers the download target resource to another image forming apparatus (for example, copying apparatus 104) which can hold the target resource.

Thus, if the holding priority of the download target resource cannot be set to "High", the target resource can be transferred to another neighboring image forming apparatus having a surplus resource holding area. Even in the case where the resource was deleted, if the downloading request source searches for the resource again, the same resource can be downloaded.

Second Embodiment

The first embodiment has been described above with respect to the case of presuming that the resources have been held in the case where the image forming apparatus downloads the resources from another image forming apparatus.

However, if a part of the necessary resources are not cached to the adjacent image forming apparatus, the adjacent image forming apparatus is instructed so as to cache the relevant resources. The adjacent image forming apparatus caches the insufficient resources into the RAM 203 based on the instruction. After that, the image forming apparatus on the request source side is notified of cache completion showing a fact that the caching of the resources has been completed. Such a processing flow will be described with reference to a conceptual diagram of FIG. 18.

Figure 18:
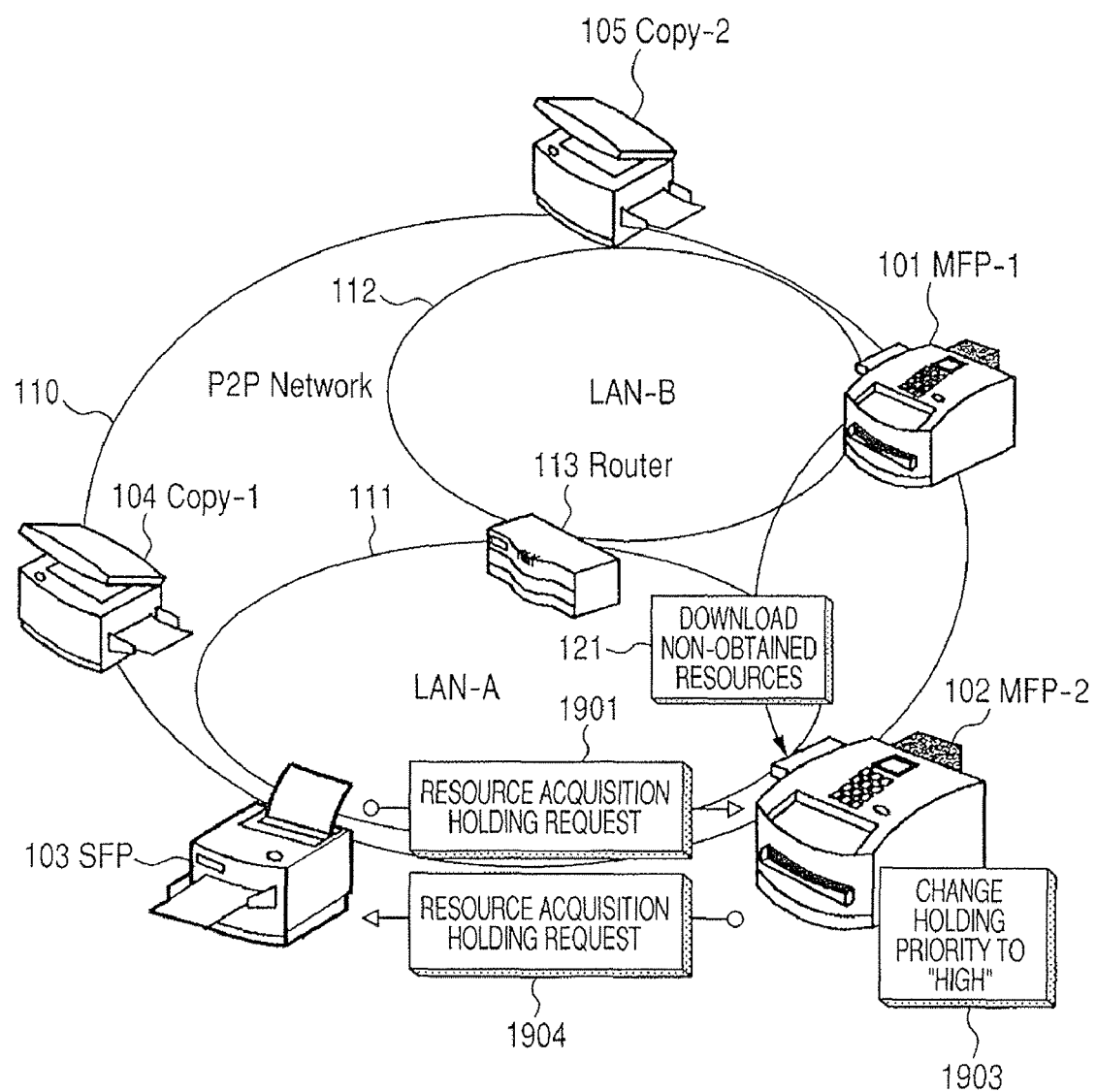
FIG. 18 is a conceptual diagram illustrating a system construction and the fundamental operation of an image forming system showing the second embodiment of the invention.

FIG. 18 is a conceptual diagram illustrating a system construction and the fundamental operation of an image forming system showing the second embodiment of the invention.

In FIG. 18, the SFP 103 has already downloaded the cached resources into the MFP 102. The SFP 103 transmits a resource acquisition holding request to the MFP 102 so as to get the resources which will be further necessary (which are not held by the MFP 102). The MFP 102 which received the resource acquisition holding request downloads the non-holding resources from the MFP 101 and sets the holding priority of the download-completed resources to "High". The MFP 102 transmits a resource acquisition holding completion response to the SFP 103 of the request source side. By receiving the completion response, the SFP 103 can grasp a fact that the MFP 102 has newly cached the resources and can download the necessary resources from the same image forming apparatus.

<Description of Resource Acquisition Holding Request Unit>

First, the whole construction has been described with reference to the conceptual diagram. Subsequently, an embodiment of the process of the SFP 103 which transmits the resource acquisition holding request will be described with reference to FIG. 19.

Figure 19:
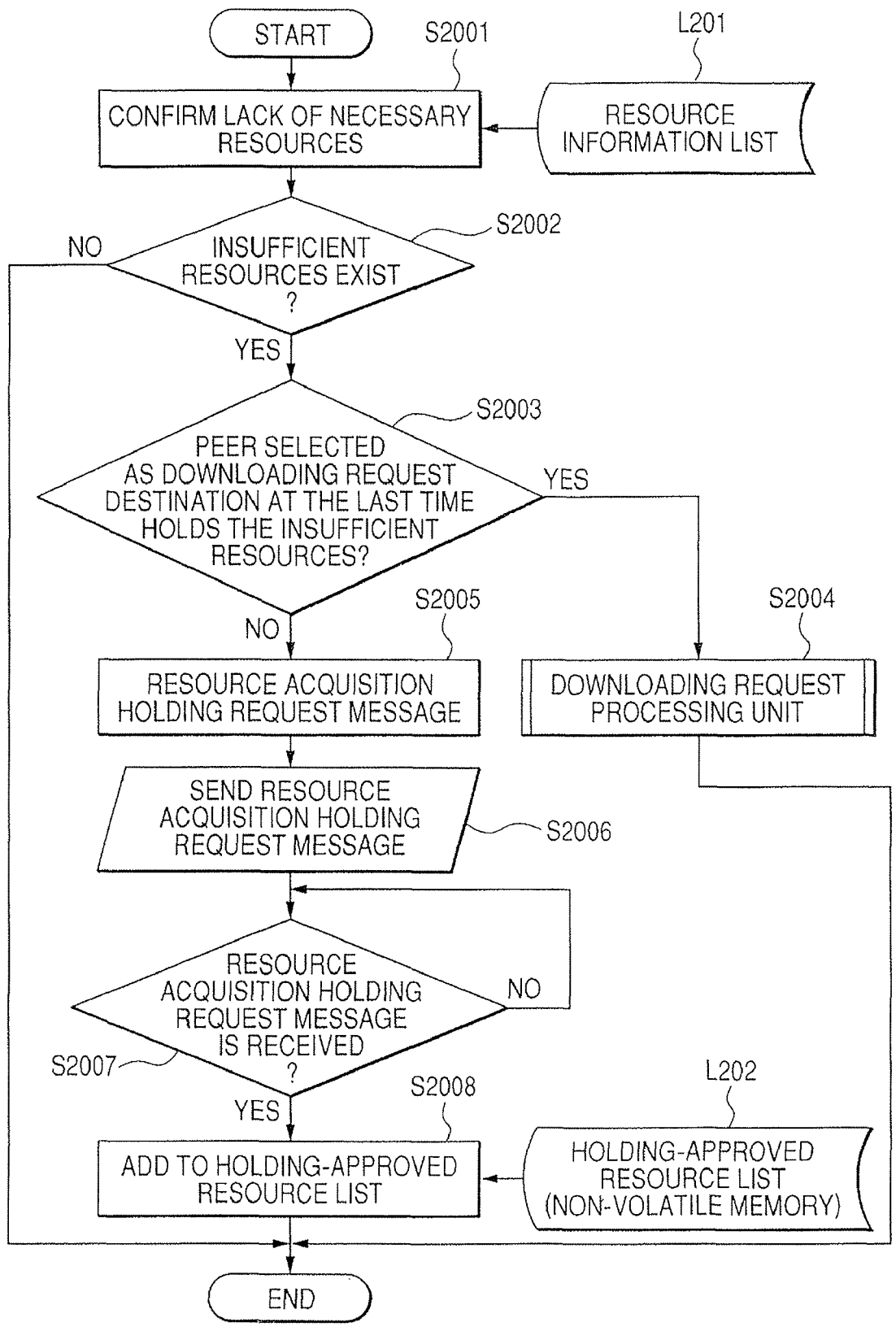
FIG. 19 is a flowchart showing an example of a tenth data processing procedure in the image forming apparatus showing the second embodiment.

FIG. 19 is a flowchart showing an example of a tenth data processing procedure in the image forming apparatus showing the embodiment. This processing procedure relates to a processing example of the SFP 103 for transmitting the resource acquisition holding request. S2001 to S2008 denote processing steps. Each processing step is realized by a method whereby the CPU 201 loads the control program stored in one of the ROM 202 and the HD 210 into the RAM 203 and executes the control program.

First, whether or not the resources necessary for image creation are insufficient is confirmed in S2001. Subsequently, the presence or absence of the insufficient resources is discriminated in S2002. If there are no insufficient resources, the processing routine is finished without executing any process.

If it is decided in S2002 that the insufficient resources exist, whether or not the peer which has previously been selected as a downloading request destination holds the insufficient resources is confirmed. If the peer holds the insufficient resources, the downloading request process which has already been described in FIGS. 9A and 9B is executed in S2004. The present processing routine is finished.

If the peer that has previously been selected as a downloading request destination does not hold the insufficient resources, a resource acquisition holding request message is formed in S2005 and transmitted in S2006.

In S2007, the apparatus waits for the reception of an acquisition holding response message. When a resource acquisition holding completion response is received, the resource is added to a holding-approved resource list L202 in S2008.

<Description of Resource Acquisition Holding Unit and Resource Acquisition Completion Response Unit>

Subsequently, an embodiment of processes of the MFP 102 to which the resource acquisition holding request has been made will be described with reference to FIG. 20.

Figure 20:
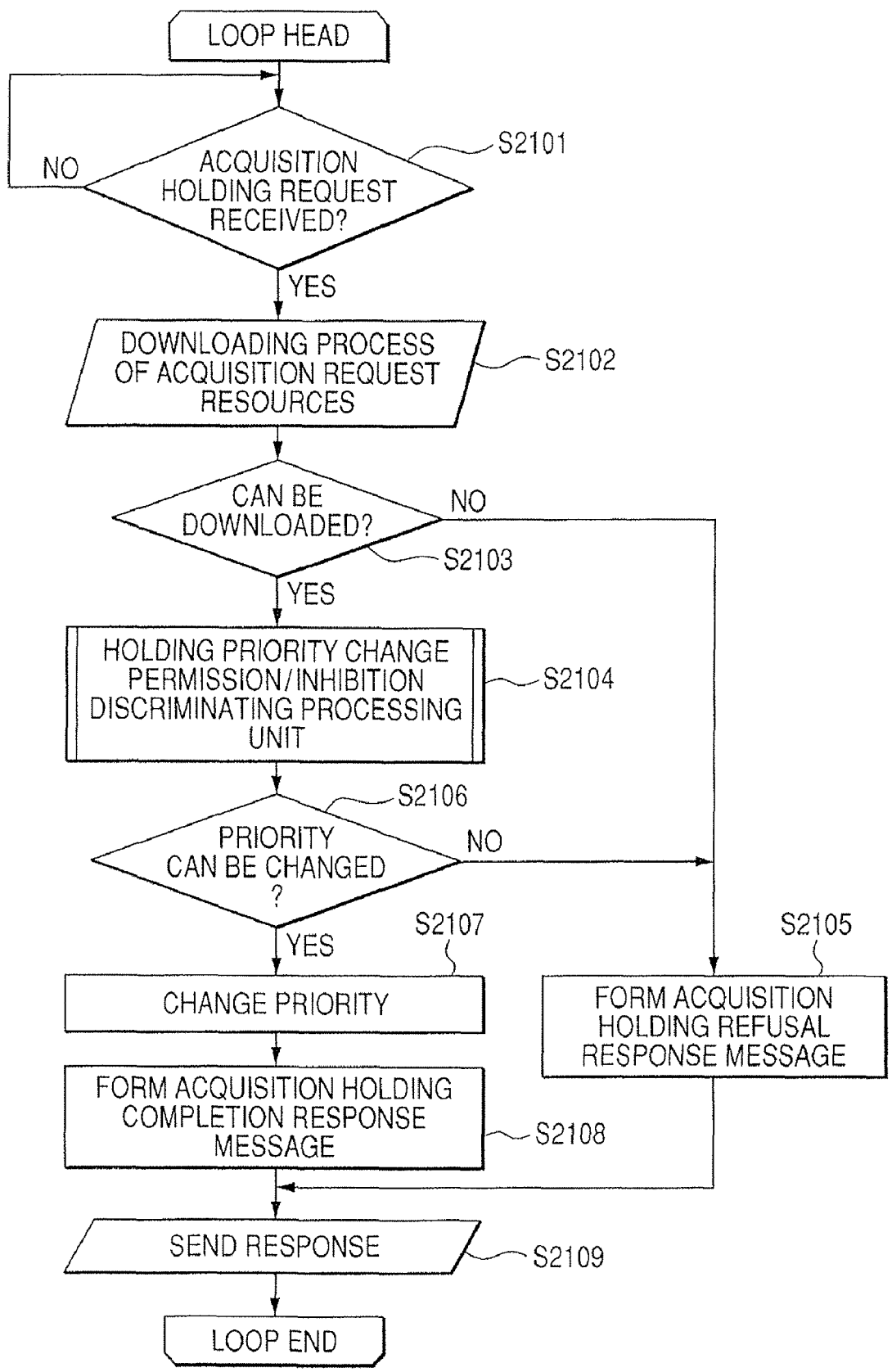
FIG. 20 is a flowchart showing an example of an eleventh data processing procedure in the image forming apparatus showing the second embodiment.

FIG. 20 is a flowchart showing an example of an eleventh data processing procedure in the image forming apparatus showing the present embodiment. This processing procedure relates to a processing example of the MFP 102 to which the resource acquisition holding request has been made. S2101 to S2109 denote processing steps. Each processing step is realized by a method whereby the CPU 201 loads the control program stored in one of the ROM 202 and the HD 210 into the RAM 203 and executes the control program.

First, in S2101, the apparatus waits for the reception of the acquisition holding request. When the acquisition holding request is received, a process for downloading the acquisition-requested resources from another image forming apparatus is executed in S2102.

Subsequently, when the downloading is normally completed in S2103, the discrimination about whether or not the holding priority can be changed which has already been described in FIG. 12 is made in S2104.

Whether or not the priority can be changed is discriminated in S2106. If it is decided in S2106 that the priority can be changed, the priority is changed in S2107. An acquisition holding completion response message is formed in S2108 and transmitted in S2109.

If it is decided in S2103 that the acquisition-requested resources cannot be downloaded or if it is decided in S2106 that the priority cannot be changed, an acquisition holding refusal response message is formed in S2105 and transmitted in S2109. The present processing routine is finished.

Thus, such a state where the image forming apparatus on the resource request source side cannot download the resources from the adjacent image forming apparatus can be avoided. The image forming apparatus can form the image by using the resources held in another image forming apparatus.

According to the foregoing embodiment, the image forming apparatus on the downloading request destination side is made to raise the holding priority of the download-requested resources, thereby enabling the apparatus to prevent the resources from being erased.

When a hard disk area for downloading in the image forming apparatus on the resource providing side is filled with data, the file to be deleted is determined based on the holding priority, so that the file having the high priority can be left in consideration of the holding request from the reasonable image forming apparatus.

The resources whose holding request has been approved and the information of the image forming apparatus which approved such a request are stored into the non-volatile memory. Thus, even when the power source is turned on again, the downloading request destination can be simplified. The re-searching time of the resources is reduced and only the holding-approved peer is searched for. Consequently, such an uncertain state where the resources cannot be downloaded can be also avoided.

By adding the unit for discriminating whether or not the resource holding request is added and the downloading is requested, unnecessary increase in the resource holding request can be prevented.

By optimizing the holding priority and reducing the priority of the resource whose holding has been determined to be unnecessary, it is possible to return the holding approval as much as possible for a resource that has been newly requested.

When the holding priority of the download-target resources cannot be set to "High", those resources can be transferred to another neighboring image forming apparatus having a surplus resource holding area. Even if the relevant resource was deleted, if the downloading request source searches for the resource again, the same resource can be downloaded.

Third Embodiment

A construction of a data processing program which can be read out by the image forming apparatus according to the invention will be described hereinbelow with reference to a memory map illustrated in FIG. 21.

FIG. 21 is a diagram for describing the memory map in a storing medium for storing various data processing programs which can be read out by the image forming apparatus according to the invention.

Although not particularly shown in the diagram, there is also a case where information for managing a program group which are stored in the storing medium, for example, version information, implementor's name, and the like are also stored and, information depending on the OS or the like on the program reading-side, for example, icons or the like for identifying and indicating the programs are also stored.

Further, data depending on the various programs is also managed on the directory. There is also a case where a program for installing the various programs into a computer and, in the case where the installing program has been compressed, a program for decompressing the compressed program, and the like are also stored.

The functions shown in FIGS. 6, 8, 9A, 9B, 10A, 10B, 12, 13, 15, 16, 17, 19, and 20 in the embodiments may be realized by a host computer according to programs which are installed from the outside. In such a case, the invention is also applied to the case where an information group including programs is supplied to an output apparatus by a storing medium such as CD-ROM, flash memory, or FD or from an external storing medium through the network.

Naturally, the objects of the invention are accomplished by such a construction that the storing medium in which program codes of software for realizing the functions of the embodiments mentioned above have been recorded is supplied to a system or an apparatus and a computer (or a CPU or an MPU) of the system or the apparatus reads out and executes the program codes stored in the storing medium.

In such a case, the program codes themselves read out of the storing medium realize the novel functions of the invention. The storing medium in which the program codes have been stored constructs the invention.

Therefore, the program may have any one of forms such as object codes, program which is executed by an interpreter, script data which is supplied to the OS, and the like and the form of the program is not limited so long as it has the functions of the program.

As a storing medium for supplying the program, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In such a case, the program codes themselves read out of the storing medium realize the functions of the embodiments mentioned above. The storing medium in which the program codes have been stored constructs the invention.

As another program supplying method, the program can be also supplied by a method whereby the apparatus is connected to Homepage of the Internet by using a browser of a client computer and the computer program itself of the invention or the compressed file including an automatic installing function is downloaded from the Homepage to a recording medium such as a hard disk or the like. The program supplying method can be also realized by a method whereby the program codes constructing the program of the invention are divided into a plurality of files and the files are downloaded from different Homepages. In other words, a WWW server, an ftp server, and the like for allowing a plurality of users to download the program files for realizing the functions and processes of the invention by the computer are also incorporated in the claims of the invention.

The program supplying method can be also realized by a method whereby the program of the invention is encrypted, stored into the storing medium such as a CD-ROM or the like, and distributed to the users, the users who can satisfy predetermined conditions are allowed to download key information for decrypting the encryption from the Homepage through the Internet, and the encrypted program is executed by using the key information and installed into the computer.

Naturally, the invention incorporates not only the case where the functions of the embodiments mentioned above are realized by a method whereby the computer executes the read-out program codes but also the case where, for example, the OS (Operating System) which is operating in the computer executes a part or all of actual processes based on instructions of the program codes and the functions of the embodiments mentioned above are realized by those processes.

Further, the invention incorporates the case where the program codes read out of the storing medium are written into a memory provided for a function expanding board inserted into the computer or a function expanding unit connected to the computer, thereafter, a CPU or the like provided for the function expanding board or the function expanding unit executes a part or all of the actual processes based on instructions of the program codes, and the functions of the embodiments mentioned above are realized by those processes.

The invention is not limited to the foregoing embodiments but many modifications (including an organic combination of the embodiments) based on the spirit of the invention are possible and they are not excluded from the scope of the invention.

Although the embodiments have been shown and described above as various examples of the invention, it will be understood from those skilled in the art that the essence and scope of the invention are not limited to those in the specific description of the present specification.

According to the embodiments, even in the case of an image forming apparatus which does not have the unit for non-volatilely holding the resources, the resources necessary for the image creation are held into another image forming apparatus and can be downloaded and used every image creation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-226276, filed Aug. 23, 2006, which is hereby incorporated by reference herein in its entirety.

What is claimed is:

1. An image forming apparatus comprising:
at least a processor and memory cooperating to function as each of:
a discrimination unit configured to discriminate, based on a holding-approved list, whether a holding-approved obtaining destination exists;
a search unit configured to search for an obtaining destination having resources including fonts absent in the image forming apparatus, if the discrimination unit discriminates that a holding-approved obtaining destination does not exist;
a decision unit configured to, if the discrimination unit discriminates that a holding-approved obtaining destination exists, decide that the existing holding-approved obtaining destination is a download request destination without the searching by the search unit, wherein, if the search unit finds an obtaining destination having resources including fonts absent in the image forming apparatus, (a) the decision unit adds the found obtaining destination to the holding-approved list and decides that the found obtaining destination is a download request destination if the found obtaining destination has a high priority for holding resources, and (b) the decision unit decides that the found obtaining destination is a download request destination without adding the found obtaining destination to the holding-approved list if the found obtaining destination does not have a high priority for holding resources;
a forming unit configured to form a download request message for resources including fonts, with a holding request; and
a sending unit configured to send the download request message formed by the forming unit to the download request destination decided by the decision unit.

2. The image forming apparatus according to claim 1, wherein the decided download request destination (a) receives the download request message with the holding request sent by the sending unit of the image forming apparatus, (b) sets the priority for holding resources to a high level and sends a message indicating a holding-approved status to the image forming apparatus if the priority can be changed, and (c) sends a message indicating a holding-refused status to the image forming apparatus if the priority cannot be changed.

3. An image forming method for an image forming apparatus, comprising:
discriminating, based on a holding-approved list, whether a holding-approved obtaining destination exists;
searching for an obtaining destination having resources including fonts absent in the image forming apparatus, if it is discriminated in said discriminating step that a holding-approved obtaining destination does not exist;
if it is discriminated in said discriminating step that a holding-approved obtaining destination exists, deciding that the existing holding-approved obtaining destination is a download request destination without the searching by the search step, wherein, if an obtaining destination is found in said searching step having resources including fonts absent in the image forming apparatus, (a) the deciding step adds the found obtaining destination to the holding-approved list and decides that the found obtaining destination is a download request destination if the found obtaining destination has a high priority for holding resources, and (b) the deciding step decides that the found obtaining destination is a download request destination without adding the found obtaining destination to the holding-approved list if the found obtaining destination does not have a high priority for holding resources;
forming a download request message for resources including fonts, with a holding request; and sending the download request message formed in said forming step to the download request destination decided in said deciding step.

4. The image forming method according to claim 3, wherein the decided download request destination (a) receives the download request message with the holding request sent by the sending step, (b) sets the priority for holding resources to a high level and sends a message indicating a holding-approved status to the image forming apparatus if the priority can be changed, and (c) sends a message indicating a holding-refused status to the image forming apparatus if the priority cannot be changed.

5. A non-transitory computer-readable storage medium, storing, in executable form, a program for causing a computer to perform an image forming method that comprises:

discriminating, based on a holding-approved list, whether a holding-approved obtaining destination exists;

searching for an obtaining destination having resources including fonts absent in the image forming apparatus, if it is discriminated in said discriminating step that a holding-approved obtaining destination does not exist;

if it is discriminated in said discriminating step that a holding-approved obtaining destination exists, deciding that the existing holding-approved obtaining destination is a download request destination without the searching by the search step, wherein, if an obtaining destination is found in said searching step having resources including fonts absent in the image forming apparatus, (a) the deciding step adds the found obtaining destination to the holding-approved list and decides that the found obtaining destination is a download request destination if the found obtaining destination has a high priority for holding resources, and (b) the deciding step decides that the found obtaining destination is a download request destination without adding the found obtaining destination to the holding-approved list if the found obtaining destination does not have a high priority for holding resources;

forming a download request message for resources including fonts, with a holding request; and sending the download request message formed in said forming step to the download request destination decided in said deciding step.

6. The non-transitory computer-readable storage medium according to claim 5, wherein the decided download request destination (a) receives the download request message with the holding request sent by the sending step, (b) sets the priority for holding resources to a high level and sends a message indicating a holding-approved status to the computer if the priority can be changed, and (c) sends a message indicating a holding-refused status to the computer if the priority cannot be changed.

* * * * *